(12) United States Patent
Teraguchi et al.

(10) Patent No.: US 11,186,206 B2
(45) Date of Patent: Nov. 30, 2021

(54) VEHICLE SEAT RECLINING DEVICE

(71) Applicant: TOYOTA BOSHOKU KABUSHIKI KAISHA, Aichi (JP)

(72) Inventors: Hiroaki Teraguchi, Aichi-ken (JP); Hiroyuki Suzuki, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/053,245

(22) PCT Filed: May 8, 2019

(86) PCT No.: PCT/JP2019/018461
§ 371 (c)(1),
(2) Date: Nov. 5, 2020

(87) PCT Pub. No.: WO2019/216359
PCT Pub. Date: Nov. 14, 2019

(65) Prior Publication Data
US 2021/0237624 A1 Aug. 5, 2021

(30) Foreign Application Priority Data

May 9, 2018 (JP) .............................. JP2018-090765

(51) Int. Cl.
*B60N 2/22* (2006.01)
(52) U.S. Cl.
CPC ........... *B60N 2/224* (2013.01); *B60N 2/2227* (2013.01)
(58) Field of Classification Search
CPC .. B60N 2/236; B60N 2/2356; B60N 2205/20; A47C 1/026
(Continued)

(56) References Cited

U.S. PATENT DOCUMENTS 6,715,835 B2 * 4/2004 Hoshihara ............... B60N 2/236
297/366
9,242,583 B2 1/2016 Endou et al.
(Continued)

FOREIGN PATENT DOCUMENTS

JP 2002-65387 3/2002
JP 2007-159847 6/2007
(Continued)

OTHER PUBLICATIONS

International Search Report in International Application No. PCT/JP2019/018461, dated Jul. 23, 2019 (along with English translation).

(Continued)

*Primary Examiner* — Sarah B McPartlin
(74) *Attorney, Agent, or Firm* — Greenblum & Bernstein, P.L.C.

(57) ABSTRACT

A vehicle seat reclining apparatus includes: a protruding portion protruding toward an inner side in a radial direction so as to be abutted by another pawl in a circumferential direction when a specific pawl abuts, in the circumferential direction, against a step formed at a boundary between a first region and a second region; and a restricting portion configured to restrict a movement range of the another pawl regulated by a regulating portion to an inner side in the radial direction than a position where the another pawl and the protruding portion interfere with each other in the radial direction.

7 Claims, 24 Drawing Sheets

(58) Field of Classification Search
USPC .................................................. 297/366, 367
See application file for complete search history.

(56) References Cited

U.S. PATENT DOCUMENTS

| | | |
|---|---|---|
| 2002/0033627 A1 | 3/2002 | Hoshihara et al. |
| 2007/0132294 A1 | 6/2007 | Yamada et al. |
| 2014/0284983 A1* | 9/2014 | Yamada ............... B60N 2/2356 297/362 |
| 2015/0035339 A1 | 2/2015 | Endou et al. |
| 2017/0334321 A1* | 11/2017 | Suzuki ................. B60N 2/2362 |
| 2018/0009340 A1 | 1/2018 | Nagura et al. |
| 2018/0029506 A1* | 2/2018 | Maeda ................... B60N 2/236 |

FOREIGN PATENT DOCUMENTS

| | | |
|---|---|---|
| JP | 2015-29635 | 2/2015 |
| JP | 2015-227071 | 12/2015 |
| JP | 2016-147526 | 8/2016 |
| WO | WO2016/129423 | 8/2016 |

OTHER PUBLICATIONS

Written Opinion in International Application No. PCT/JP2019/018461, dated Jul. 23, 2019.

* cited by examiner

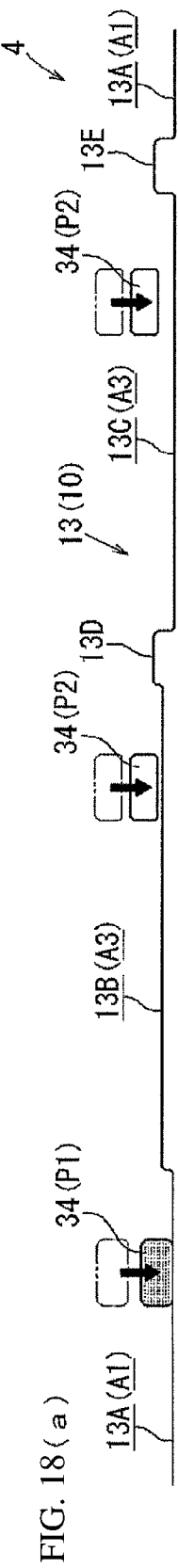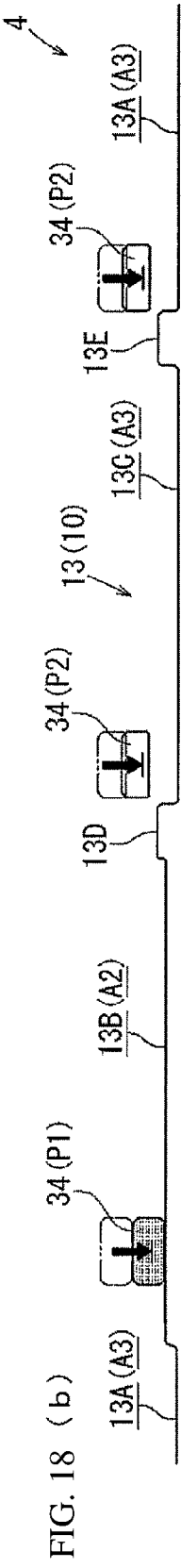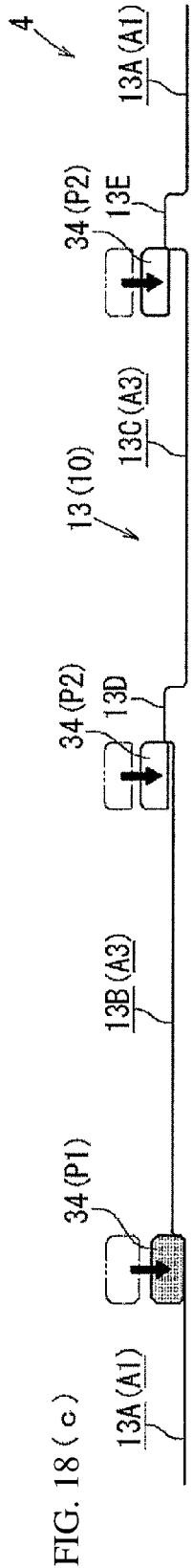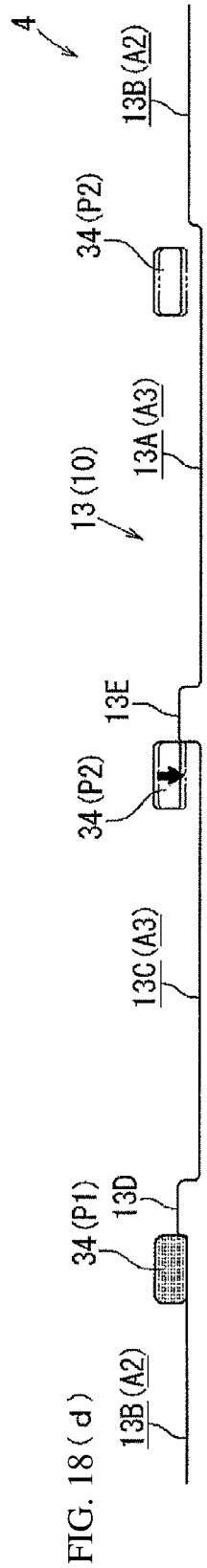

VEHICLE SEAT RECLINING DEVICE

TECHNICAL FIELD

The present invention relates to a vehicle seat reclining apparatus. More specifically, the present invention relates to a vehicle seat reclining apparatus for adjusting an inclination angle of a seat back.

BACKGROUND ART

In related art, as a vehicle seat reclining apparatus, a seat reclining apparatus having a stepped lock mechanism capable of adjusting a backrest angle of a seat back at a constant pitch angle is known (Patent Literature 1). The vehicle seat reclining apparatus is configured as a joint apparatus that couples the seat back with respect to a seat cushion in a state capable of adjusting the backrest angle. Specifically, the vehicle seat reclining apparatus is configured to include a ratchet and a guide that are respectively formed by substantially disc-shaped metal members assembled to each other in a relatively rotatable manner, and a lock mechanism that locks relative rotation between the ratchet and the guide.

The lock mechanism is configured such that a plurality of pawls set on the guide are urged and thereby pressed against inner peripheral teeth formed on an outer peripheral portion of the ratchet, thereby locking the relative rotation between the ratchet and the guide. More specifically, a rotation region of the ratchet with respect to the guide is provided with a lock region that allows engagement of each pawl and a free region that can cause each pawl to ride on so as to prevent the engagement of each pawl.

By setting the free region, when the seat back is in a forward-inclining angular region in which the ratchet is in the free region, the seat back is held in a state in which each pawl rides on the free region and is not locked even if operation on a lever for releasing the engagement of each pawl is released. Accordingly, in the free region, the seat back can be tilted up to a forward-tilting position without performing operation on the lever.

Specifically, the free region set in the rotation region of the ratchet is formed only at one position in a circumferential direction, and causes only a specific one among the plurality of the pawls to ride on, while the other pawls are positioned in other regions deviated from the free region. Even in such configuration in which only one specific pawl rides on the free region, since movement of a cam that presses each pawl against the inner peripheral teeth of the ratchet is stopped due to the ride on, each pawl can be prevented from being locked.

Further, a protruding portion is formed such that in a case where the specific pawl abuts against a step while transiting from the lock region to the free region, the protruding portion simultaneously abut against the other pawls when the specific pawl abuts against the step so as not to concentrate a load on the specific pawl. Due to the protruding portion, the load at the time when the specific pawl abuts against the step is also distributed to the other pawls.

CITATION LIST

Patent Literature

Patent Literature 1: WO 2016/129423 A1

SUMMARY OF INVENTION

Technical Problem

In the related art, when the specific pawl transits from the free region to the lock region, the specific pawl moves in a manner of going down the step and thus is not abutted against the step, whereas the other pawls may be caught by the protruding portion. An object of the present invention is to prevent a pawl from being caught when a vehicle seat reclining apparatus transits from a free region to a lock region.

Solution to Problem

[1] In a first aspect of the present invention, a vehicle seat reclining apparatus is a vehicle seat reclining apparatus including:

a disc-shaped ratchet and a disc-shaped guide that are coaxially assembled to each other in a relatively rotatable manner;

a lock mechanism provided between the ratchet and the guide and capable of restricting relative rotation between the ratchet and the guide; and a holding ring holding a state in which the ratchet and the guide are assembled, in which the lock mechanism includes:
a plurality of pawls supported by the guide in a movable manner in a radial direction, the plurality of pawls being configured to engage with the ratchet to restrict relative rotation between the ratchet and the guide when the plurality of pawls move toward an outer side in the radial direction, and
a cam configured to move the plurality of pawls towards an inner side in the radial direction or the outer side in the radial direction, in which the ratchet has:
a first region that allows a specific pawl among the plurality of pawls to move towards the outer side in the radial direction to engage with the ratchet;
a second region that prevents the specific pawl from moving towards the outer side in the radial direction to engage with the ratchet; and
a third region in which another pawl is located when the specific pawl is in the second region, the first region, the second region, and the third region being arranged in a circumferential direction, in which the third region has a protruding portion protruding towards the inner side in the radial direction so as to be abutted by the another pawl in the circumferential direction when the specific pawl abuts in the circumferential direction against a step formed at a boundary between the first region and the second region, in which the cam includes a regulating portion configured to regulate a movement range of the another pawl in the radial direction when the specific pawl is in the second region, and in which the vehicle seat reclining apparatus further includes a restricting portion configured to restrict the movement range of the another pawl regulated by the regulating portion to an inner side in the radial direction than a position where the another pawl and the protruding portion interfere with each other in the radial direction.

According to the first aspect, when the specific pawl is in the second region (for example, when the specific pawl rides on a free region to be described later), the restricting portion restricts the movement range of the another pawl in the radial direction to a position at which the another pawl does not interfere with the protruding portion. Therefore, when the vehicle seat reclining apparatus transits from the second region (free region) to the first region (lock region), it is possible to prevent the another pawl from being caught by the protruding portion.

[2] According to a second aspect of the present invention, in the first aspect, the restricting portion is configured to restrict the movement range of the another pawl regulated by the regulating portion to the inner side than a position of the specific pawl when the specific pawl moves to an outermost side in the radial direction in the second region.

According to the second aspect, the position of the another pawl in the radial direction when the another pawl comes into contact with the regulating portion of the cam is on an inner side in the radial direction than the position of the specific pawl in the radial direction when the specific pawl is in the second region (free region). With such a simple configuration, the restricting portion can be implemented.

[3] According to a third aspect of the present invention, in the second aspect, the regulating portion includes a plurality of drawing-in pins protruding in an axial direction from the cam, and the restricting portion protrudes such that a surface of a drawing-in hole of the another pawl in contact with one of the plurality of drawing-in pins in the radial direction is positioned on the outer side in the radial direction than a surface of a drawing-in hole of the specific pawl in contact with another one of the plurality of drawing-in pins in the radial direction.

According to this third aspect, the another pawl is provided with the surface of the drawing-in hole so as to contact the drawing-in pin provided on the cam. The surface of the drawing-in hole protrudes to the outer side in the radial direction than the surface of the drawing-in hole of the specific pawl. With such a simple configuration, the restricting portion can be implemented.

[4] According to a fourth aspect of the present invention, in the first aspect, the restricting portion is configured such that, when the specific pawl is in the second region, a projection, which protrudes in the axial direction from the another pawl so as to abut against the protruding portion in the circumferential direction, and the protruding portion have a gap therebetween in the radial direction.

According to the fourth aspect, when the specific pawl is in the second region (free region), the projection (riding projection) of the another pawl and the protruding portion have a gap therebetween in the radial direction. With such a simple configuration, the restricting portion can be implemented.

[5] According to a fifth aspect of the present invention, in the fourth aspect, the protruding portion has a protruding height such that, when the specific pawl is in the second region, a gap between the protruding portion and the projection of the another pawl in the radial direction is present.

According to the fifth aspect, the protruding portion has a protruding height such that a gap between the protruding portion and the projection (riding projection) of the another pawl is present. With such a simple configuration, the restricting portion can be implemented.

(a) to (d) of FIG. 17 are cross-sectional views showing a change in the locking operation of each pawl caused by a change in a rotational position of the ratchet.

(a) to (d) of FIG. 18 are schematic views showing a positional relation between a riding projection of each pawl and a projecting portion of the ratchet in FIGS. 17(a) to 17(d).

Figure 19:
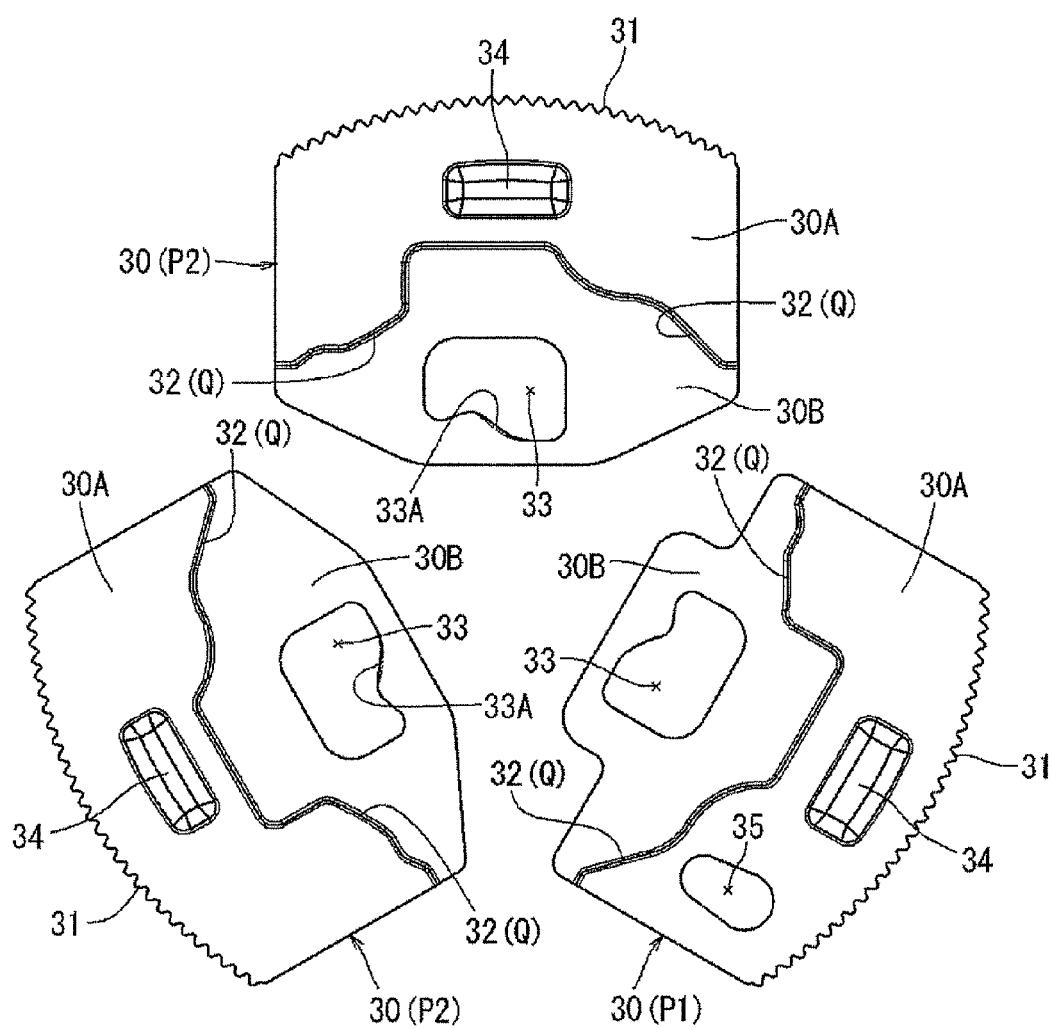

FIG. 19 is an outer side view of the pawls.

Figure 20:
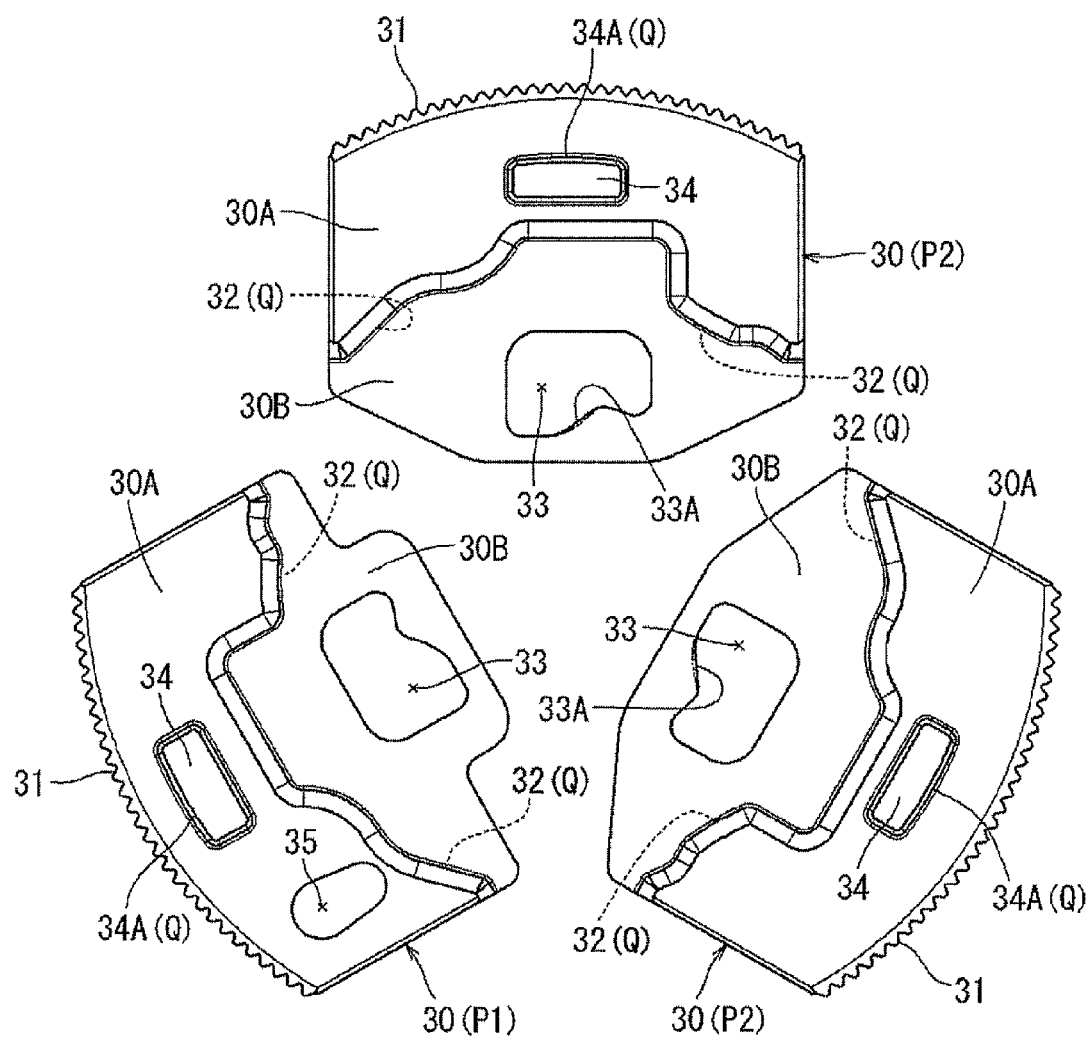

FIG. 20 is an inner side view of the pawls.

Figure 21:
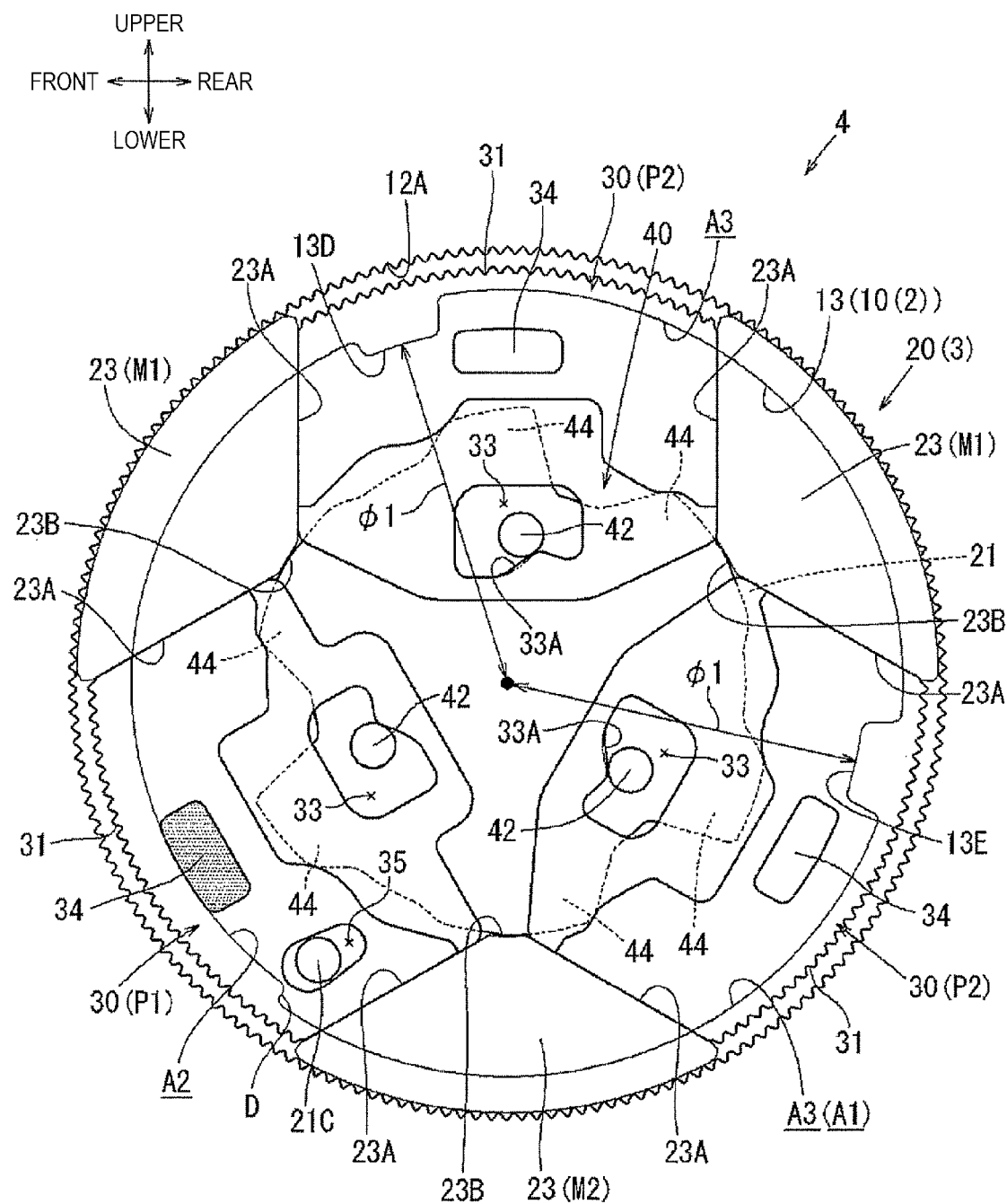

FIG. 21 is an enlarged view of a main part for comparing surface shapes of through holes of the pawls.

Figure 13:
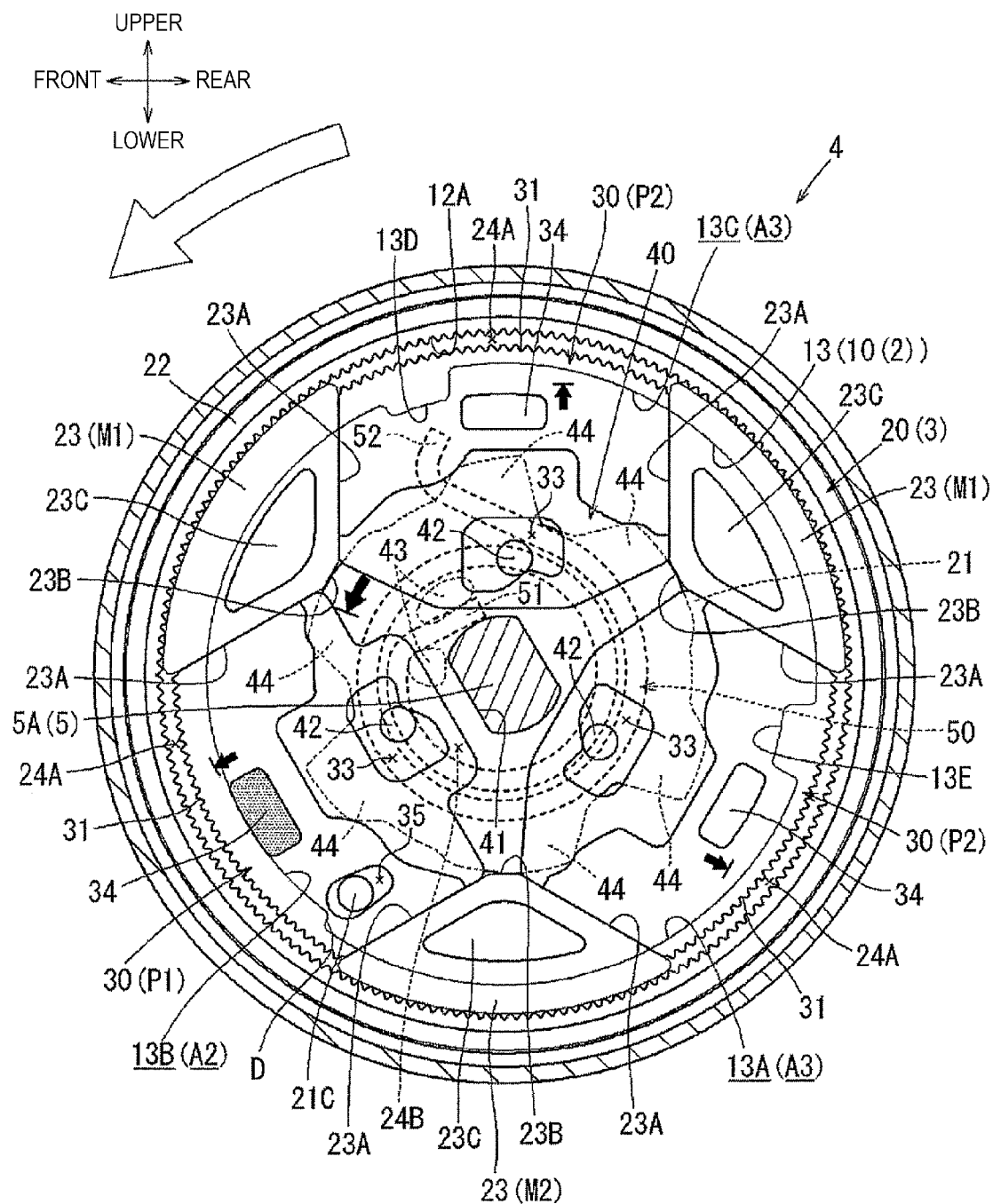
FIG. 13 is a cross-sectional view showing a state in which locking operation of the vehicle seat reclining apparatus is prevented from FIG. 12.
Figure 22:
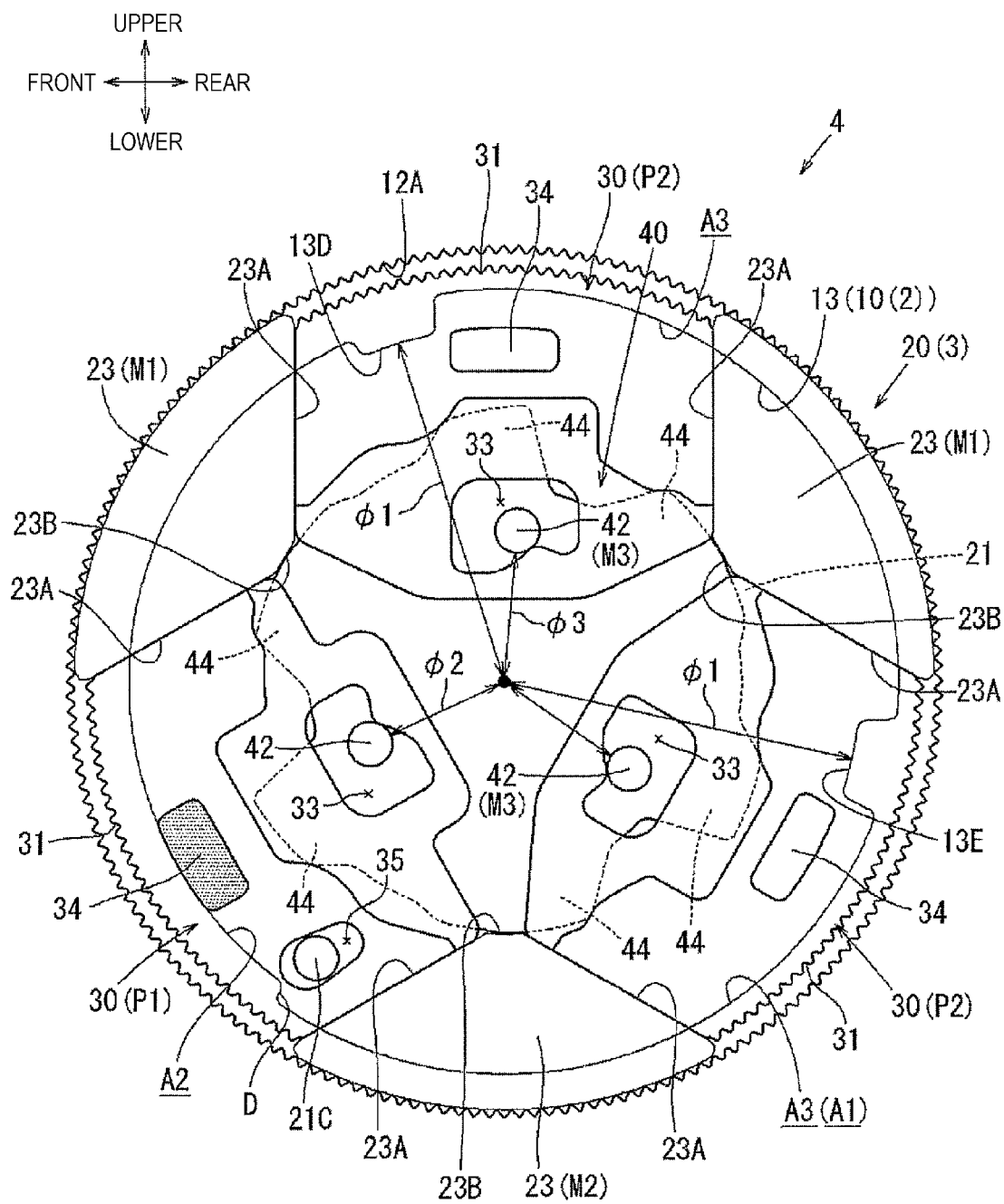

FIG. 22 is a cross-sectional view corresponding to FIG. 13 showing a schematic configuration of a vehicle seat reclining apparatus of Embodiment 2.

Figure 23:
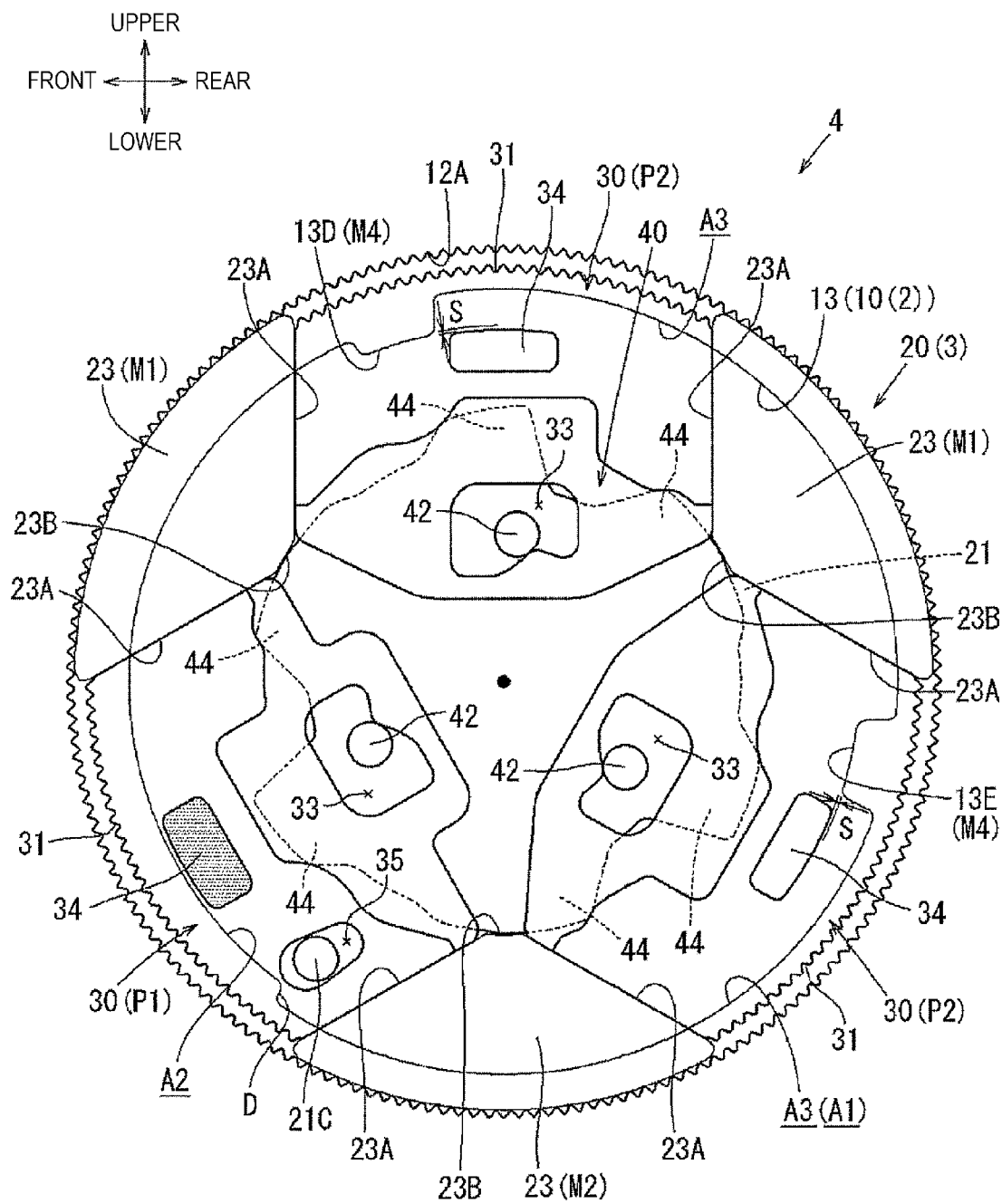

FIG. 23 is a cross-sectional view corresponding to FIG. 13 showing a schematic configuration of a vehicle seat reclining apparatus of Embodiment 3.

Figure 24:
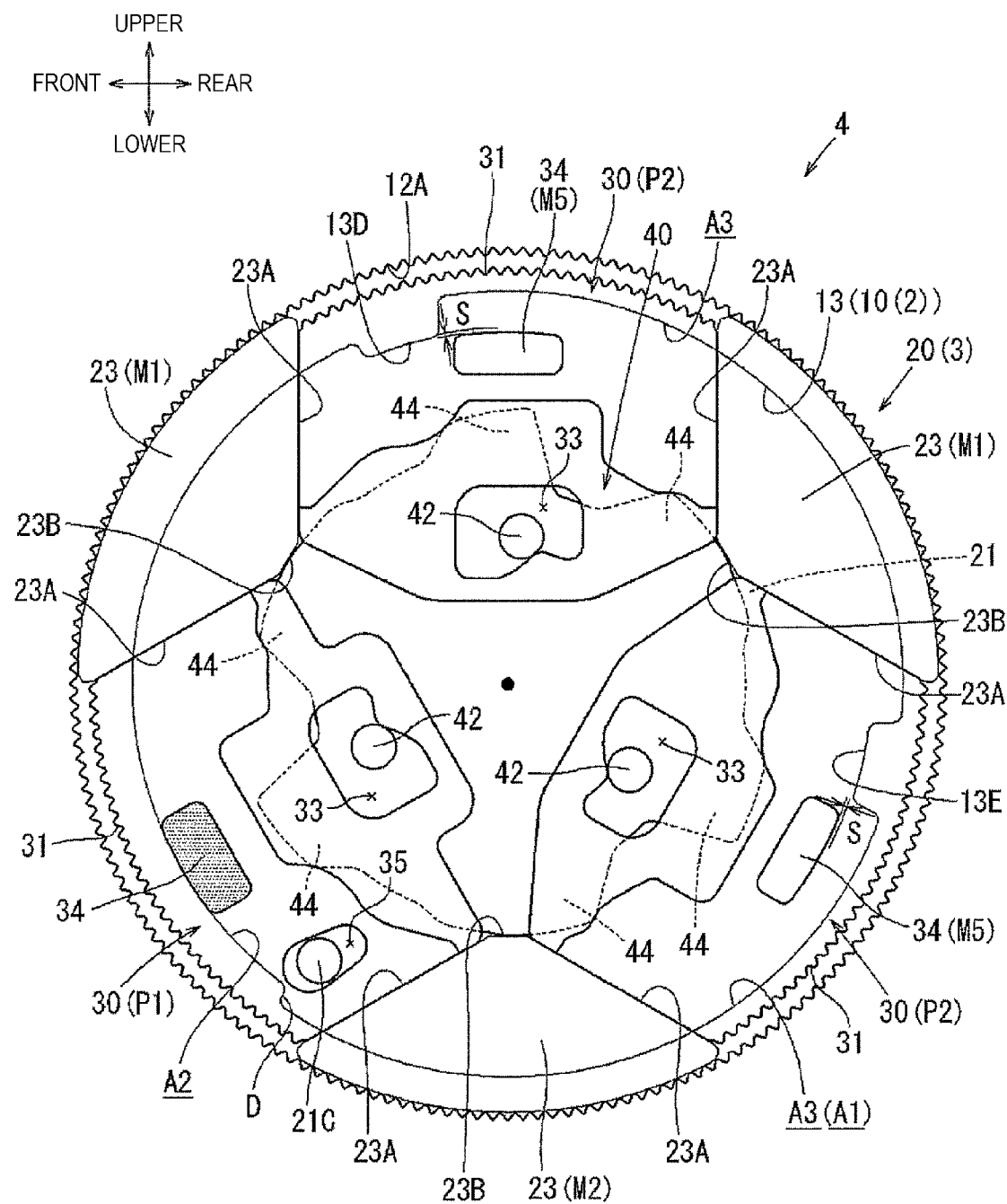

FIG. 24 is a cross-sectional view corresponding to FIG. 13 showing a schematic configuration of a vehicle seat reclining apparatus of Embodiment 4.

DESCRIPTION OF EMBODIMENTS

Embodiments of the present invention will be described below with reference to the drawings.

Embodiment 1

<<Schematic Configuration of Seat Reclining Apparatus 4>>

First, a configuration of a vehicle seat reclining apparatus 4 of Embodiment 1 (hereinafter, simply referred to as "apparatus 4") will be described with reference to FIGS. 1 to 21. In the following description, directions, such as front, rear, upper, lower, left, and right, indicate respective directions shown in the drawings. Further, a "seat width direction" indicates a left-right direction of a seat 1.

Figure 1:
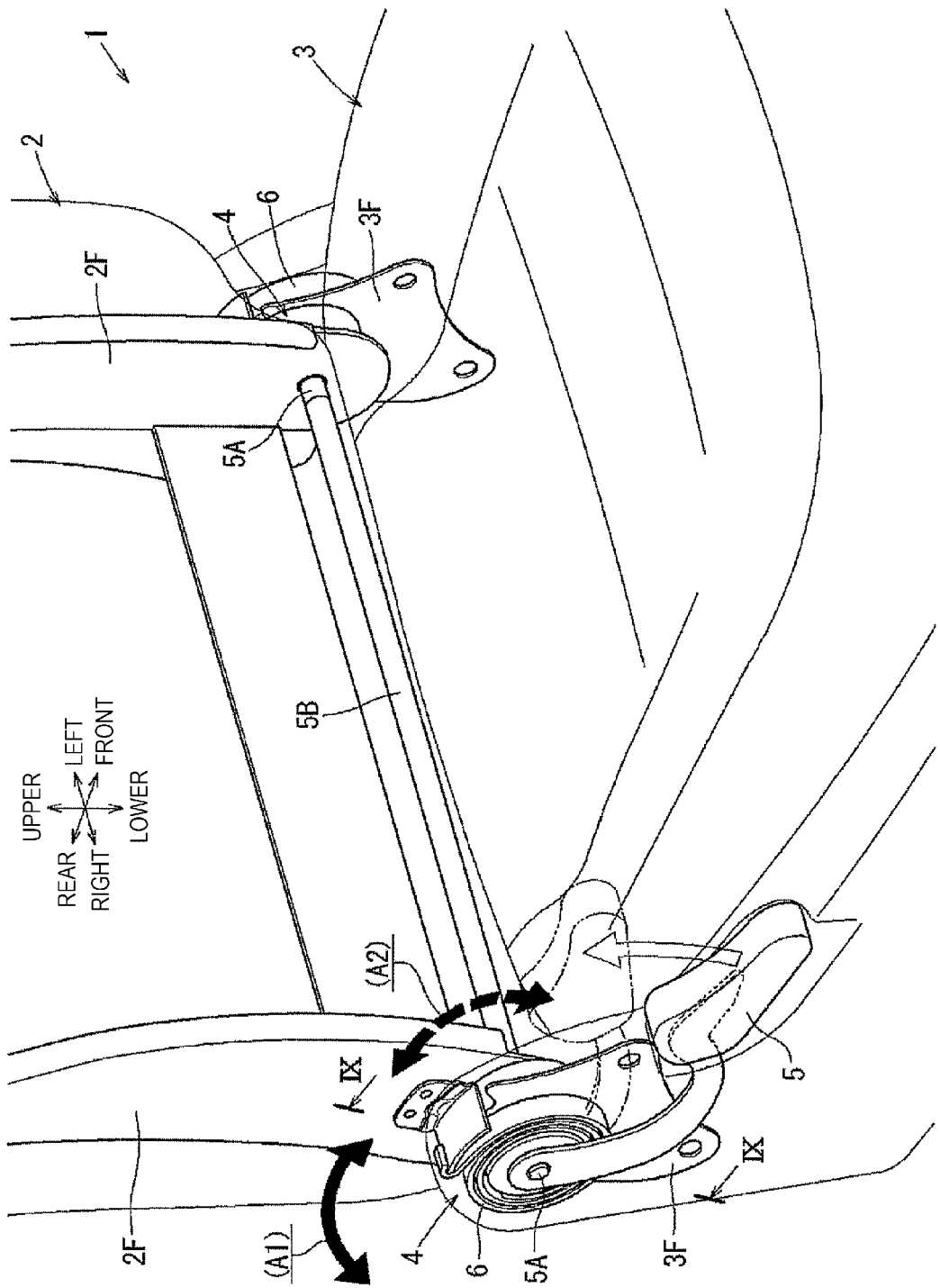
FIG. 1 is a perspective view showing a schematic configuration of a vehicle seat applied with a vehicle seat reclining apparatus of Embodiment 1.

As shown in FIG. 1, the apparatus 4 of the present embodiment is applied to a seat 1 constituting a right seat of an automobile. The apparatus 4 is configured as a seat reclining adjustment mechanism that couples a seat back 2 serving as the backrest portion of the seat 1 to a seat cushion 3 serving as a seating portion in a state in which a backrest angle can be adjusted. Specifically, the apparatus 4 is provided in a pair of left and right between the seat back 2 and the seat cushion 3, and are each integrated and switched between locked and unlocked states, so as to fix or release the backrest angle of the seat back 2.

Figure 2:
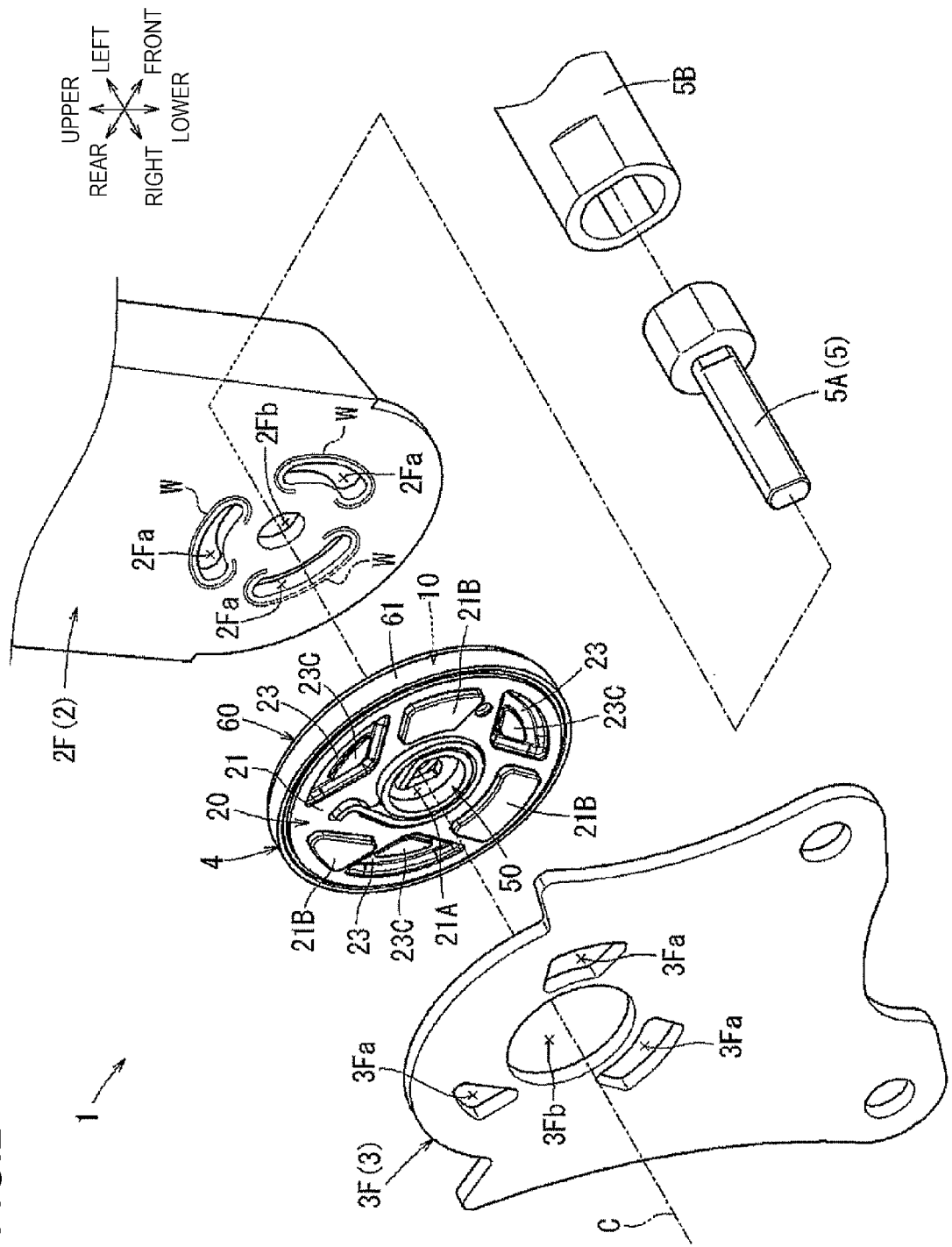
FIG. 2 is a partial exploded perspective view of FIG. 1.
Figure 3:
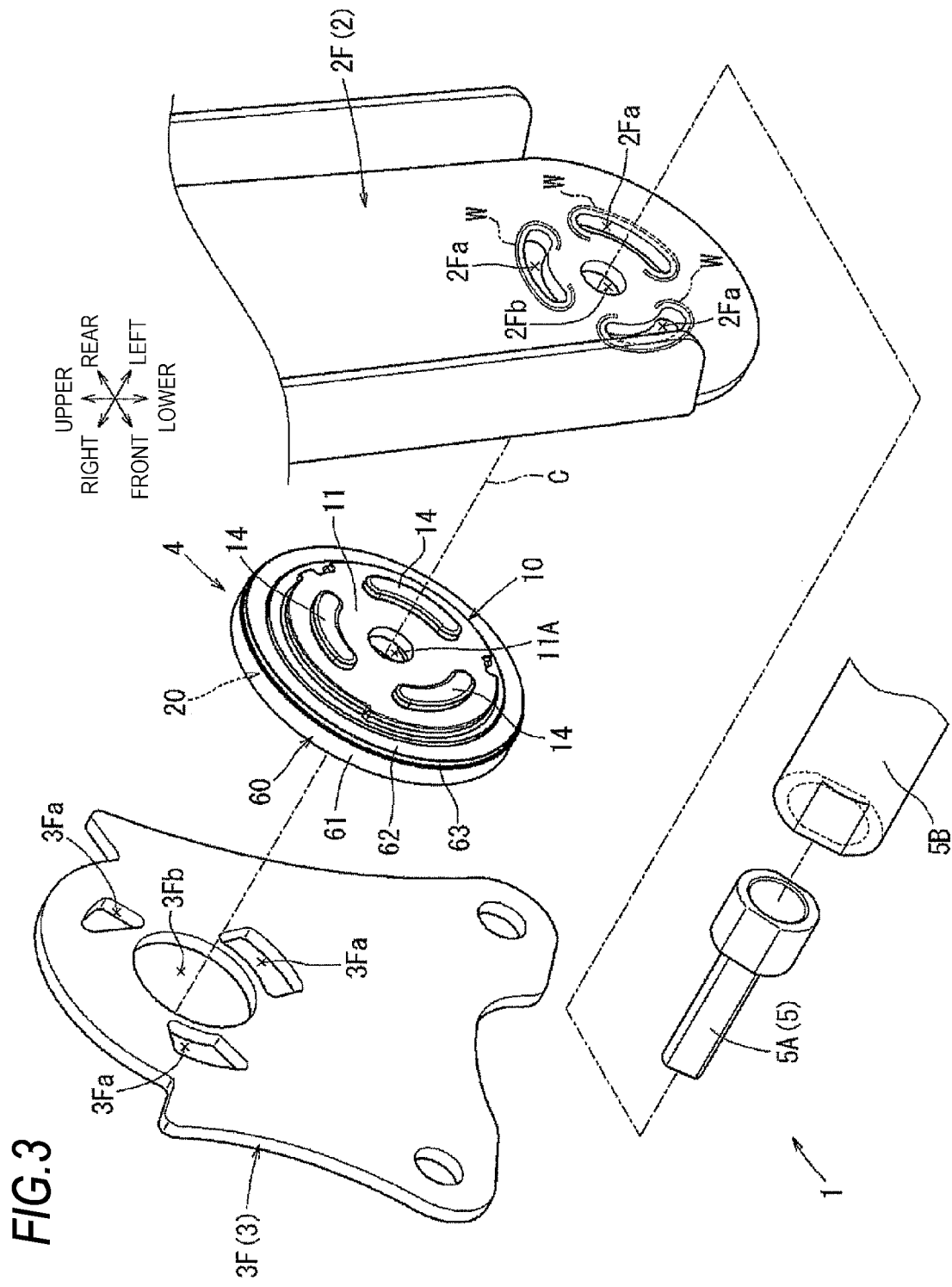
FIG. 3 is an exploded perspective view as viewed from a side opposite to FIG. 2.

Specifically, the apparatuses 4 are respectively provided between lower end portions of side frames 2F forming left and right side frames of the seat back 2 and reclining plates 3F connected to rear end portions of left and right side frames of the seat cushion 3 that are positioned on outer sides of the side frames 2F in the seat width direction, and are connected in a manner that allows or stops relative rotation thereof (refer to FIGS. 2 and 3).

The apparatuses 4 are normally held in the locked state in which the backrest angle of the seat back 2 is fixed. The apparatuses 4 are switched to the unlocked state in which the backrest angle of the seat back 2 can be changed by pulling up a reclining lever 5 provided on a right side portion, which corresponds to a vehicle outer side of the seat cushion 3, thereby simultaneously releasing the locked state of the apparatuses 4. Then, the apparatuses 4 are urged and returned to the locked state again when the operation state of pulling up the reclining lever 5 is returned.

Here, return springs 6 that constantly apply a spring urging force to the seat back 2 in a forward-tilting rotation direction are respectively hooked between the side frames 2F on the left and right sides of the seat back 2 and the reclining plates 3F disposed on the outer sides of the side frames 2F. Due to the rotational urging force of the return spring 6, by releasing the fixed state of the backrest angle due to the apparatuses 4, the seat back 2 is raised to a position corresponding to the back of a seated occupant, and the backrest angle thereof is freely adjusted in the front-rear direction in correspondence with front-rear tilting of the back of the seated occupant. According to the above configuration, the seat back 2 can easily adjust the backrest angle.

The seat back 2 can rotate in a seat front-rear direction within a rotation region of about 180 degrees between a forward-tilting position that is folded on an upper surface of the seat cushion 3 and a rearward-tilting position that is substantially tilted straight rearward. Within this region, a rotation region of about 90 degrees in which the backrest angle of the seat back 2 is from an upright position erected substantially straight upward to the rearward-tilting position is set as a "lock region A1" in which the backrest angle of the seat back 2 is returned to the fixed state by the pulling operation of the reclining lever 5 being released. A rotation region in which the backrest angle of the seat back 2 is from the upright position to the forward-tilting position is set as a "free region A2" maintained in a state in which the backrest angle of the seat back 2 is maintained in the released state without being returned to the fixed state even if the pulling operation of the reclining lever 5 is released.

The lock region A1 and the free region A2 correspond to the lock region A1 and the free region A2 set in the apparatus 4 to be described later, respectively. By setting the free area A2, when the reclining lever 5 is operated in a state where no person is sitting on the seat 1, if the seat back 2 is urged by the return spring 6 and tilted to a position within the free region A2, the seat back 2 is then tilted to a forward-tilting posture position even without continuing the operation state of the reclining lever 5. Here, the lock region A1 corresponds to the "first region" of the present invention, and the free region A2 corresponds to the "second region" of the present invention.

As shown in FIGS. 2 and 3, each apparatus 4 specifically includes a ratchet 10 integrally coupled to an outer surface of the side frame 2F on each side of the seat back 2, and a guide 20 integrally coupled to an inner surface of the reclining plate 3F on each side, and fixes or releases the backrest angle of the seat back 2 by locking or releasing relative rotation between the ratchet 10 and the guide 20.

«Specific Configuration of Apparatus 4»

Hereinafter, a specific configuration of the pair of left and right apparatuses 4 will be described in detail. Since each apparatus 4 has the same configuration that is left-right symmetrical with respect to each other, the configuration of one side disposed on the vehicle outer side (right side) shown in FIGS. 2 and 3 will be described below as a representative example.

Figure 4:
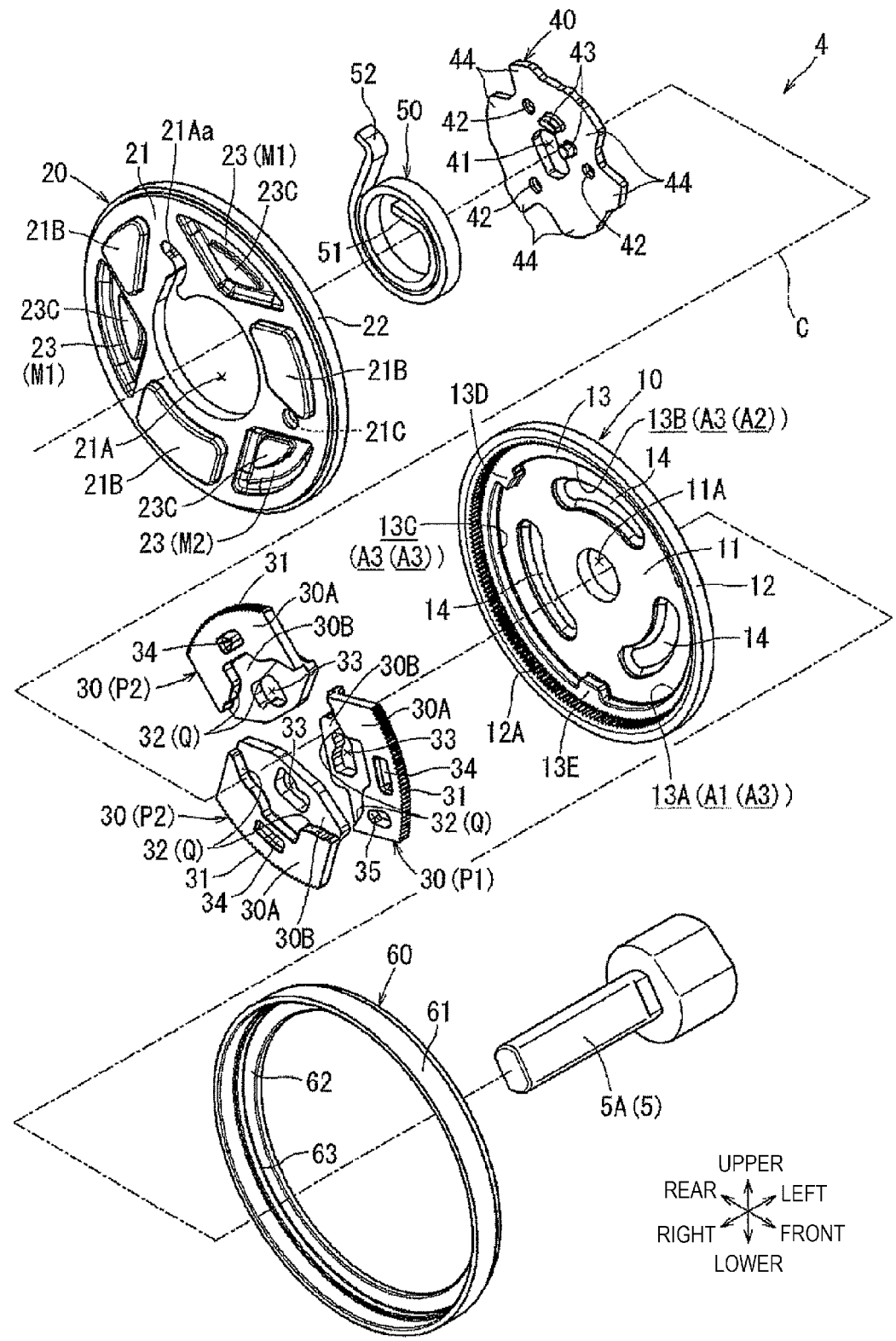
FIG. 4 is an exploded perspective view of the vehicle seat reclining apparatus.
Figure 5:
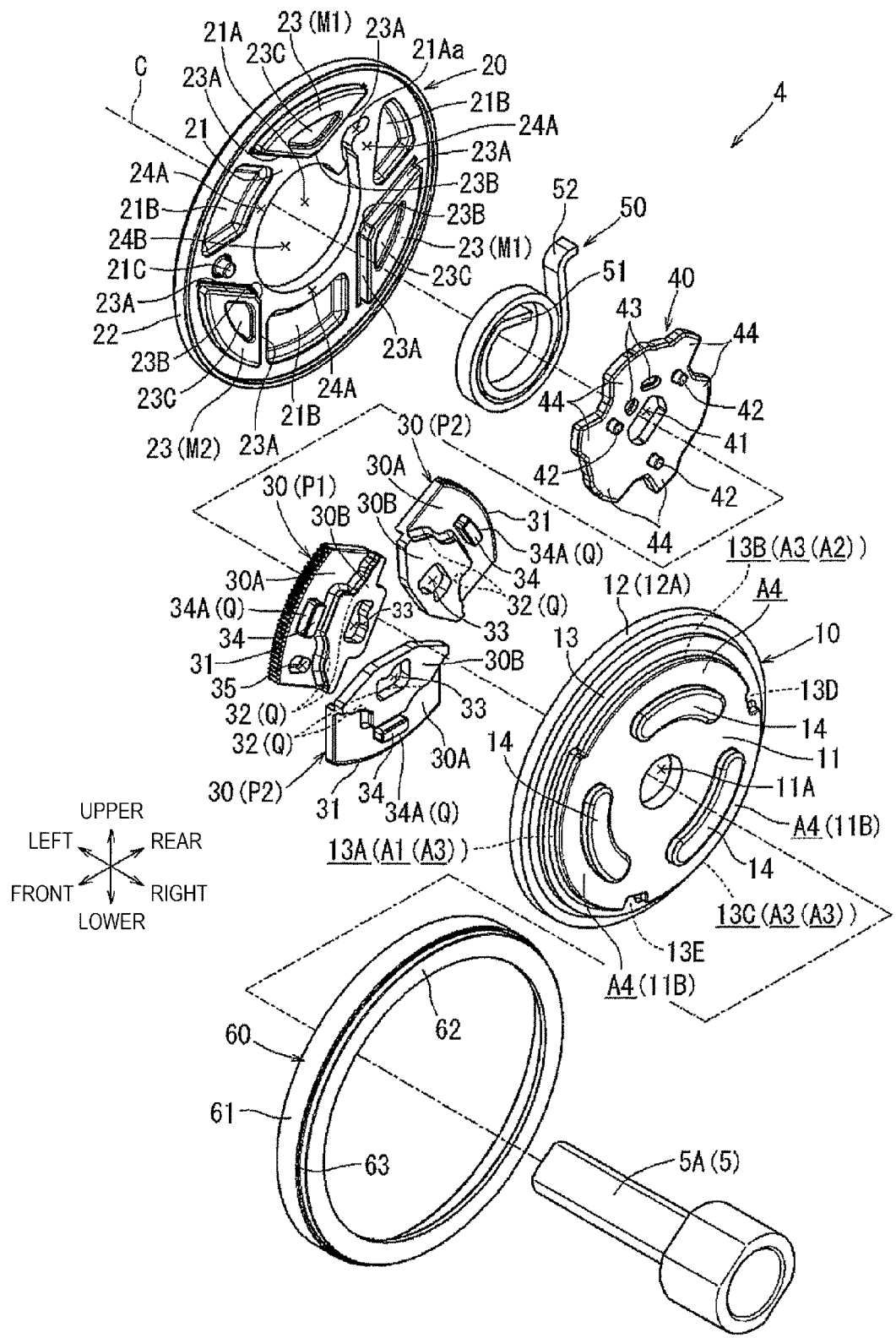
FIG. 5 is an exploded perspective view as viewed from a side opposite to FIG. 4.

As shown in FIGS. 4 and 5, the apparatus 4 includes the ratchet 10 and the guide 20 that are substantially disc-shaped and assembled together in an axial direction, three pawls 30 assembled therebetween, a rotary cam 40 that moves the pawls 30 in an inner side and an outer side in a radial direction, a lock spring 50 including a spiral spring that urges the rotary cam 40 in a rotation direction of locking, and a substantially cylindrical outer peripheral ring 60 that is mounted between outer periphery portions of the ratchet 10 and the guide 20 and holds them in a state assembled together in the axial direction. The ratchet 10, the guide 20, the three pawls 30, and the rotary cam 40 are each subjected to quenching treatment after press molding, so as to be hardened and to have and enhanced structural strength. Here, the rotary cam 40 corresponds to the "cam" of the present invention. A mechanism composed of the three pawls 30 and the rotary cam 40 which moves the pawls 30 corresponds to the "lock mechanism" of the present invention. The outer peripheral ring 60 corresponds to the "holding ring" of the present invention. Hereinafter, specific configurations of the members constituting the apparatus 4 will be described in detail.

«Ratchet 10»

As shown in FIG. 4, the ratchet 10 is formed by cutting one metal plate member into a substantially disc shape and half-blanking in the plate thickness direction (axial direction) in some positions.

Specifically, a cylindrical portion 12 protruding in a substantially cylindrical shape in the axial direction as a direction of assembly to the guide 20 is formed at an outer peripheral edge portion of a disc body 11 of the ratchet 10. In detail, the cylindrical portion 12 is formed by subjecting the outer peripheral edge portion of the disc body 11 to half-blanking into a shape protruding in a two-step manner, thereby shaped into a stepped cylindrical shape having an inner-outer two-step cylindrical shape having an intermediate cylindrical portion 13 formed on an inner peripheral side thereof, the intermediate cylindrical portion 13 being smaller than the cylindrical portion 12 in the axial direction and protruding in the axial direction.

In the inner peripheral surface of the cylindrical portion 12, inner peripheral teeth 12A whose tooth surfaces face the inner side in the radial direction are formed continuously over an entire region in the circumferential direction. The inner peripheral teeth 12A are formed to have a shape of tooth surfaces capable of being pressed from the inner side in the radial direction and engaging with outer peripheral teeth 31 formed on an outer peripheral surface of each pawl 30, which will be described later. Specifically, the inner peripheral teeth 12A are formed such that the tooth surfaces thereof are arranged at regular intervals in the circumferential direction at a pitch of 2 degrees.

An inner peripheral surface of the intermediate cylindrical portion 13 is formed with three circumferential regions (regions 13A, 13B, and 13C) in which an inner diameter from a central portion (central axis C) and a circumferential length are set individually, and a first protruding portion 13D and a second protruding portion 13E protruding toward the inner side in the radial direction from boundaries between portions of these regions.

The region 13A, the region 13B, and the region 13C are formed to have inner peripheral surface shapes that are curved so as to draw arcs on concentric circles around the central portion (central axis C). Specifically, the region 13A and the region 13C are formed to have inner peripheral surface shapes having an inner diameter larger than that of the region 13B, and the region 13A and the region 13C are formed to have inner peripheral surface shapes having the same inner diameter.

Figure 10:
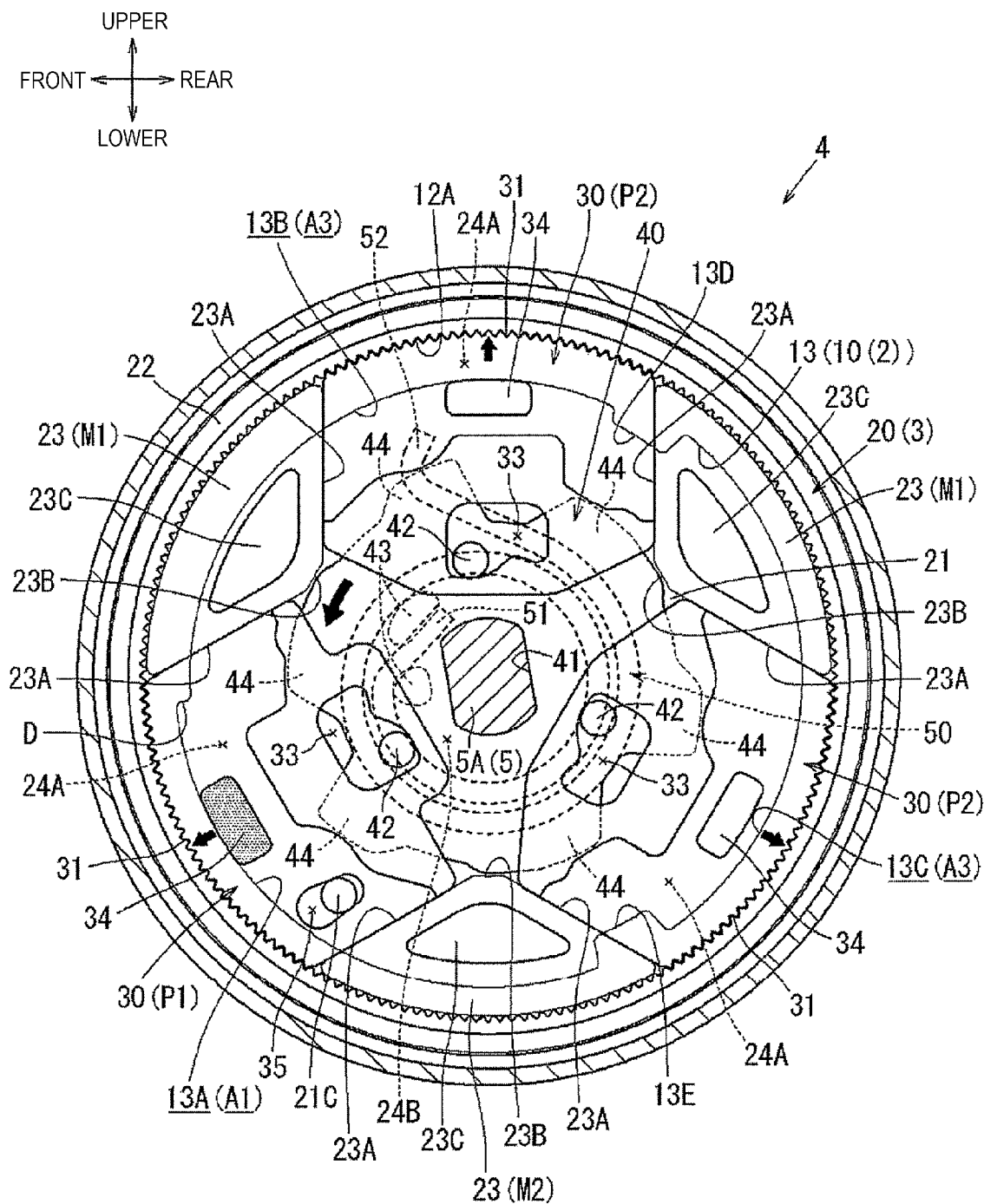
FIG. 10 is a cross-sectional view taken along line X-X of FIG. 8 showing a locked state of the vehicle seat reclining apparatus.

As shown in FIG. 10, (a) of FIG. 17, and (a) of FIG. 18, the region 13A constitutes a lock region A1 of a main pawl P1 among the three pawls 30 to be described later, such that when the main pawl P1 is arranged in a manner overlapping with the region in the circumferential direction due to rotation of the ratchet 10, the main pawl P1 is allowed to move toward the outer side in the radial direction so as to engage with the inner peripheral teeth 12A of the ratchet 10, thereby caused to perform locking operation. Here, the main pawl P1 corresponds to the "specific pawl" of the present invention.

When the main pawl P1 is arranged in a manner overlapping with the region 13A in the circumferential direction, the region 13B and the region 13C function as other regions A3 that are arranged in a manner overlapping with the remaining two sub pawls P2 among the three pawls 30 in the circumferential direction, so as to allow engaging movement of the sub pawls P2 toward the inner peripheral teeth 12A of the ratchet 10. Here, the other regions A3 correspond to the "third region" of the present invention.

Figure 12:
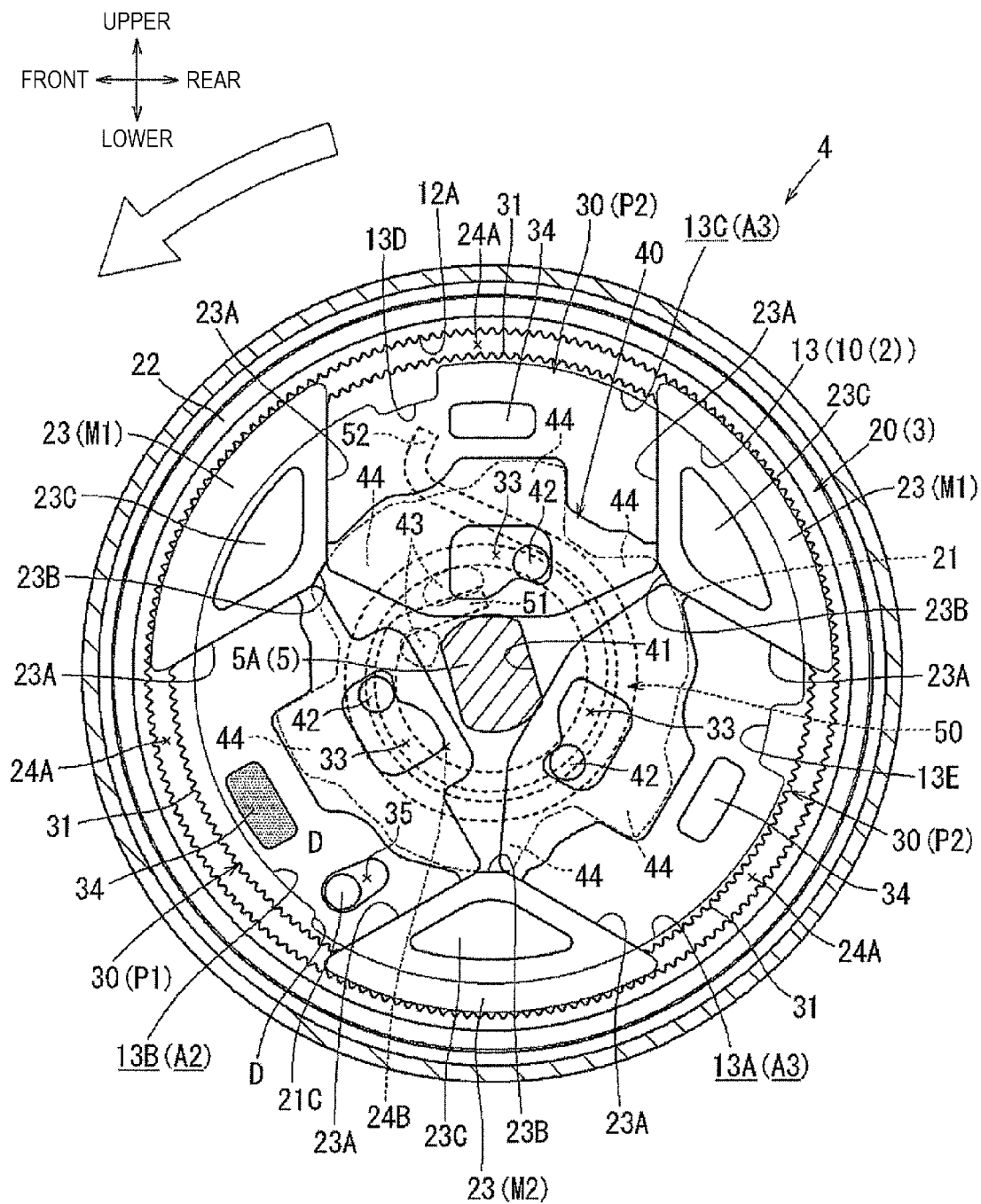
FIG. 12 is a cross-sectional view showing a state in which a ratchet is turned from FIG. 11 to a free region.

However, as shown in FIG. 12, when the main pawl P1 is arranged in a manner overlapping with the region 13B in the circumferential direction, the region 13B constitutes the free region A2 of the main pawl P1, which functions to cause the main pawl P1 to ride on and to stop the movement of the main pawl P1 in the outer side in the radial direction which causes the main pawl P1 to engage with the inner peripheral teeth 12A of the ratchet 10 as shown in FIG. 13, (b) of FIG. 17, and (b) of FIG. 18. Here, the sub pawls P2 corresponds to "another pawl" of the present invention.

When the main pawl P1 is arranged in a manner overlapping with the region 13B in the circumferential direction, the region 13C and the region 13A respectively function as the other regions A3 that overlap with the remaining two sub pawls P2, so as to release movement of the sub pawls P2 that is synchronized with movement of the main pawl P1 in these regions.

That is, the intermediate cylindrical portion 13 of the ratchet 10 forms the lock region A1 that allows the locking operation of the main pawl P1 in the region 13A (see FIG. 10, (a) of FIG. 17 and (a) of FIG. 18), and forms the free region A2 that allows the ratchet 10 to rotate freely in the circumferential direction while stopping the locking operation of the main pawl P1 by causing the main pawl P1 to ride on so as to keep the unlocked state in the region 13B (see FIG. 13, (b) of FIG. 17 and (b) of FIG. 18).

As shown in FIG. 10, (a) of FIG. 17, and (a) of FIG. 18, when the main pawl P1 is arranged in a manner overlapping with the region 13A in the circumferential direction, the region 13B and the region 13C respectively function as the other regions A3 to allow the remaining two sub pawls P2 to perform the locking operation in synchronization with the movement of the main pawl P1. As shown in FIG. 13, (a) of FIG. 17, and (a) of FIG. 18, when the main pawl P1 is arranged in a manner overlapping with the region 13B in the circumferential direction due to the rotation of the ratchet 10, the region 13C and the region 13A respectively become the other regions A3 and function to allow stop of the locking operation of the remaining two sub pawls P2 in synchronization with the movement of the main pawl P1.

In this way, the intermediate cylindrical portion 13 of the ratchet 10 is configured to perform control to allow or stop the locking operation of the main pawl P1 by the region 13A and the region 13B, such that the movement of the remaining two sub pawls P2 in synchronization with the movement of the main pawl P1 can be released by the other regions where the two sub pawls P2 are positioned at that time (the other regions A3).

As shown in (c) of FIG. 17 and (c) of FIG. 18, when the main pawl P1 transits from the region 13A to the region 13B due to the rotation of the ratchet 10, in a case where the main pawl P1 is accidentally pressed against a step D between the lock region A1 (region 13A) and the free region A2 (region 13B) in a state of being pushed half-way toward the outer side in the radial direction, the first protruding portion 13D and the second protruding portion 13E function to simultaneously contact the other two sub pawls P2, so that a load generated thereby is also dispersed to the two sub pawls P2 without concentrating only in the main pawl P1.

That is, the first protruding portion 13D and the second protruding portion 13E are respectively formed at positions to be pressed against the remaining two sub pawls 2P in the circumferential direction when the main pawl P1 is pressed against the step D between the region 13A and the region 13B in the circumferential direction due to the rotation of the ratchet 10.

Figure 14:
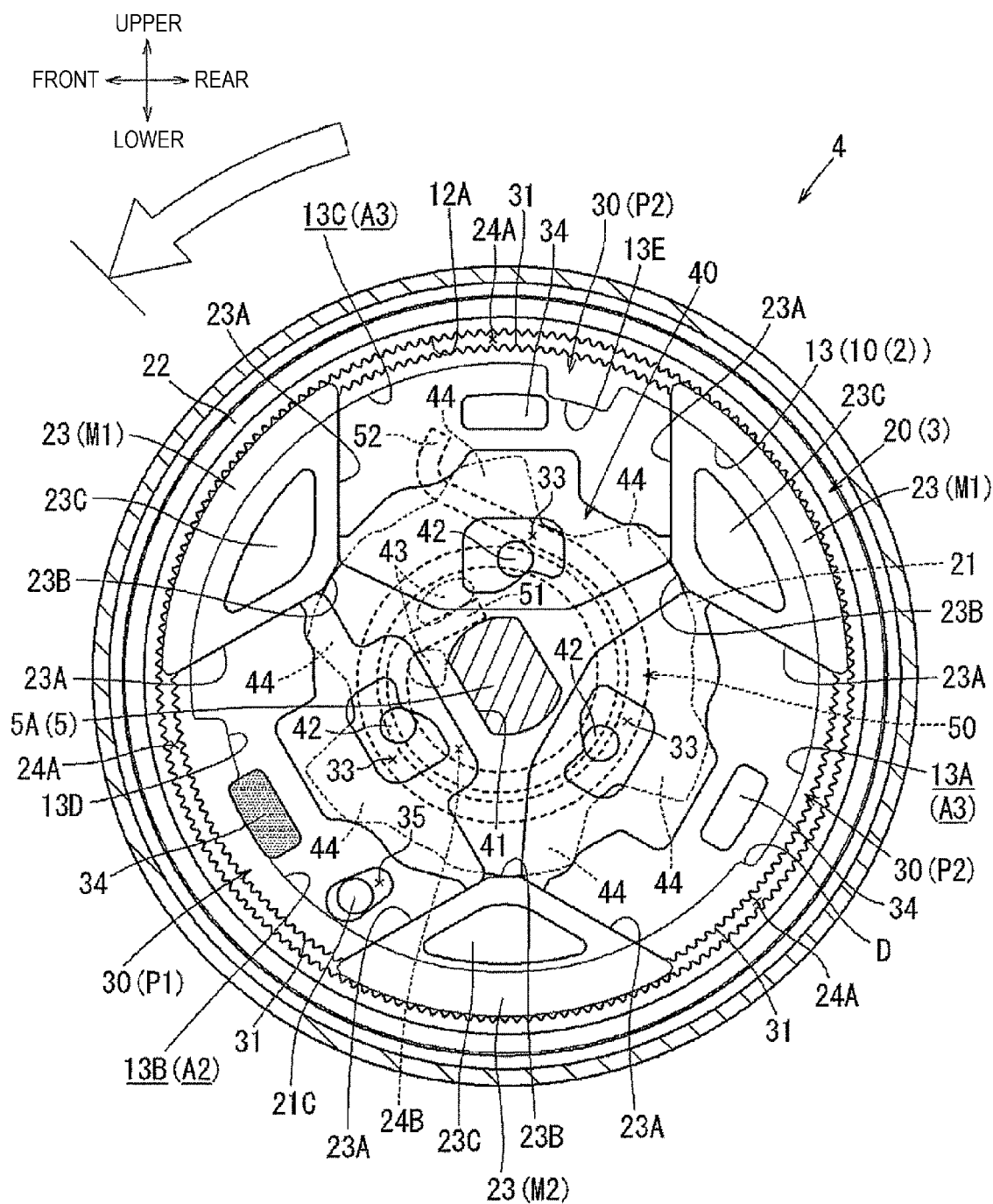
FIG. 14 is a cross-sectional view showing a state in which the ratchet is turned from FIG. 12 to an end position of the free region.

As shown in FIG. 14, (d) of FIG. 17 and (d) of FIG. 18, the first protruding portion 13D and the second protruding portion 13E are respectively formed at positions to be pressed against the main pawl P1 and one sub pawl P2 in the circumferential direction when the main pawl P1 moves to an end position in the circumferential direction in the region 13B, that is, the free region A2, due to the rotation of the ratchet 10. At this time, the remaining one of the sub pawls P2 is positioned so as to be pressed against the step D between the region 13A and the region 13B in the circumferential direction. Thereby, when the seat back 2 is tilted to the above-described forward-tilting position that is folded onto the upper surface of the seat cushion 3 in FIG. 1, the apparatus 4 is brought into a state in which further rotation is locked at that position.

As shown in FIGS. 4 and 5, a through hole 11A penetrating in a round hole shape is formed at a central portion (position on the central axis C) of the disc body 11 of the ratchet 10. In the through hole 11A, an operation pin 5A inserted into a central portion (position on the central axis C) of the rotary cam 40 to be described later is inserted in a freely rotatable state from the outside in the axial direction. Further, as shown in FIG. 5, on an outer surface of the disc body 11 of the ratchet 10 described above, protruding portions (hereinafter referred to as "dowels 14") protruding in the axial direction in an arc shape are respectively formed at three positions in the circumferential direction arranged on the same circumference around the central portion (central axis C) of the outer surface.

The dowels 14 are formed so as to respectively fit in formation regions in the circumferential direction in which the region 13A, the region 13B, and the region 13C of the intermediate cylindrical portion 13 are formed. As shown in FIG. 3, the ratchet 10 configured as above is integrally coupled to the side frame 2F of the seat back 2 by assembling the outer surface of the disc body 11 to the outer surface of the side frame 2F of the seat back 2 in a surface contact manner, and welding contact portions therebetween (welding locations W).

More specifically, the ratchet 10 is coupled to the side frame 2F of the seat back 2 by respectively assembling the three dowels 14 formed on the outer surface of the disc body 11 in a state fitted into three corresponding fitting holes 2Fa formed in the side frame 2F in a manner penetrating in a substantially arc shape, and joining peripheral regions of the fitted locations (coupling regions A4) to the side frame 2F in a surface contact state by laser welding (welding locations W).

Figure 7:
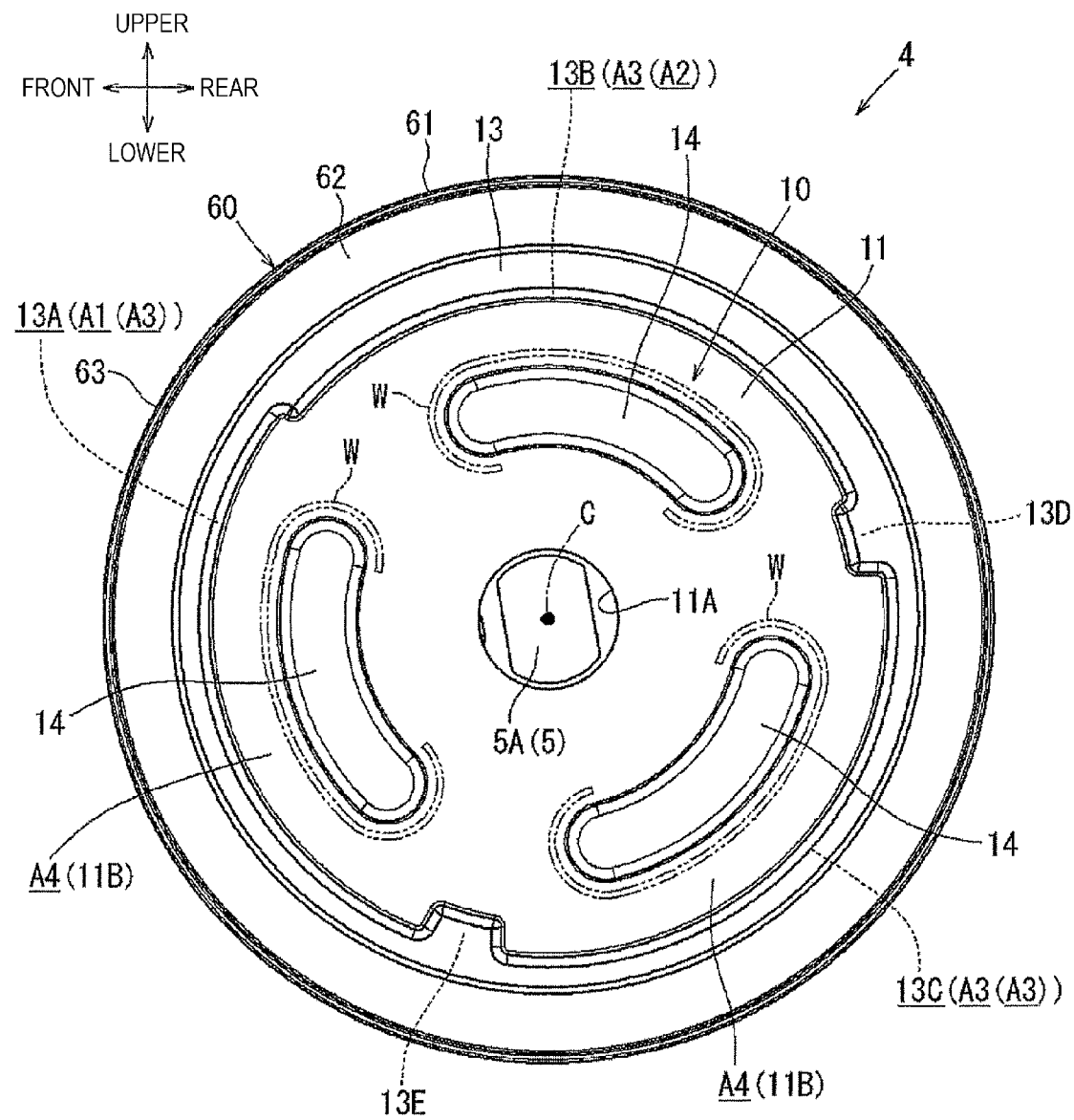
FIG. 7 is an inner side view of the vehicle seat reclining apparatus.
Figure 8:
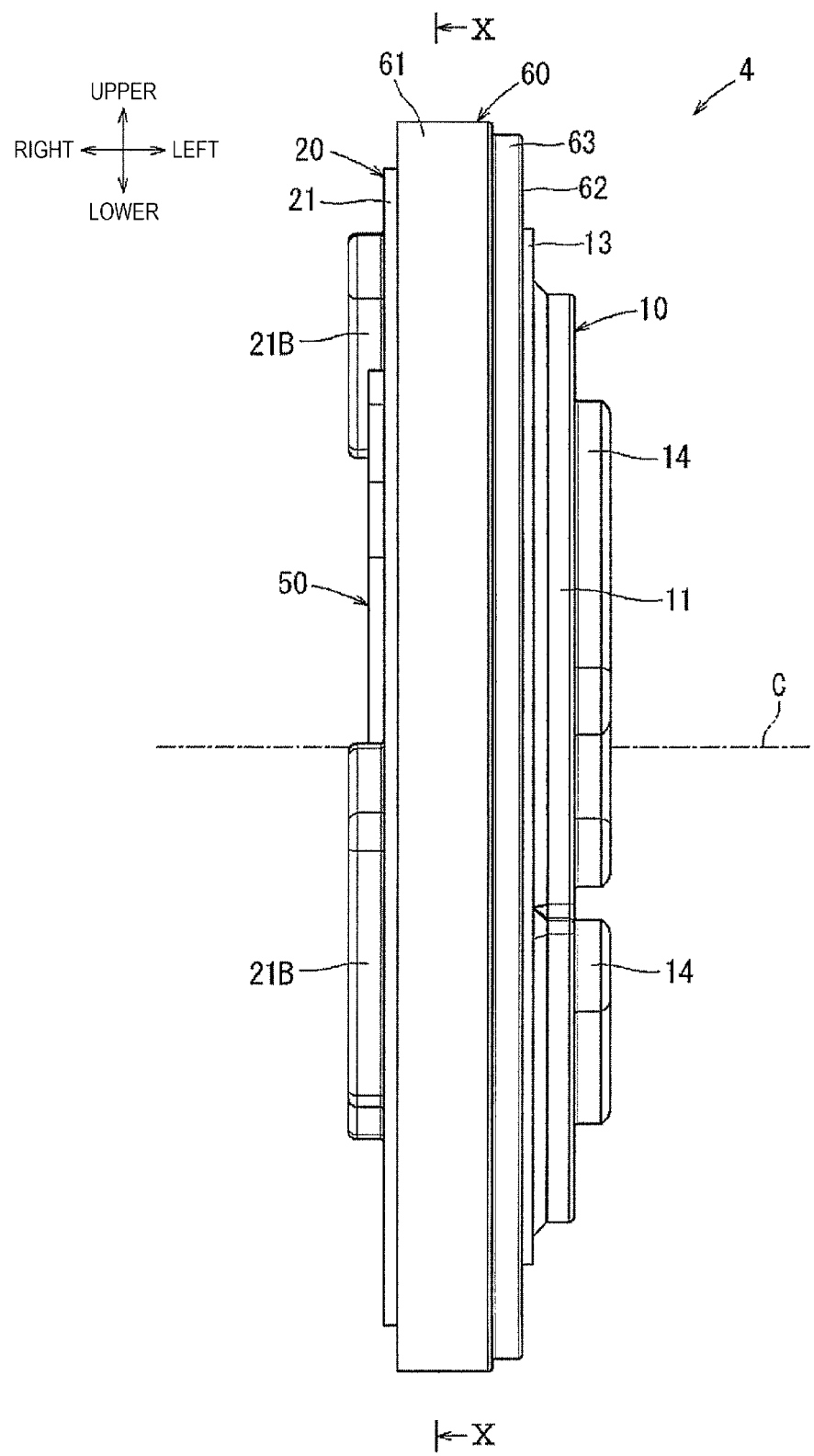
FIG. 8 is a front side view of the vehicle seat reclining apparatus.

More specifically, on the outer surface of the disc body 11 of the ratchet 10, the coupling regions A4 in surface contact with and laser-welded to the side frame 2F are formed in regions on the outer side in the radial direction and on both sides in the circumferential direction of regions in which the three dowels 14 are formed. As shown in FIG. 7, since the region 13A and the region 13C of the intermediate cylindrical portion 13, which are formed on an outer peripheral edge of the coupling regions A4, are formed at positions expanded toward the outer side in the radial direction than the region 13B, each region of the coupling regions A4 that are in formation regions in the circumferential direction in which the region 13A and the region 13C are formed has an expanded surface portion 11B that has an expanded area in the radial direction as compared with a region among the coupling regions A4 that is in a formation region in the circumferential direction in which the region 13B is formed.

According to the above configuration, the outer surface of the disc body 11 of the ratchet 10 is firmly welded to the side frame 2F in a state in which the two coupling regions A4 each having the expanded surface portion 11B, which are in the formation regions in the circumferential direction in which the region 13A and the region 13C are formed, are in contact with the side frame 2F in a manner wider toward the outer side in the radial direction than the one coupling region A4 in the formation region in the circumferential direction in which the region 13B is formed.

Specifically, the welding of the outer surface of the disc body 11 of the ratchet 10 to the side frame 2F is performed in a manner such that each dowel 14 is enclosed in a C shape spanning from the region on the outer side in the radial direction to both the side regions in the circumferential direction and a weld bead enters therein (welding locations W). The side frame 2F is formed with a penetrating hole 2Fb through which the operation pin 5A passing through the through hole 11A formed in the central portion (position on the central axis C) of the ratchet 10 can pass to the outside in the axial direction.

<<Guide 20>>

As shown in FIG. 5, the guide 20 is formed by cutting one metal plate member into a substantially disc shape having an outer diameter larger than that of the ratchet 10 and half-blanking in the plate thickness direction (axial direction) in some positions.

Figure 9:
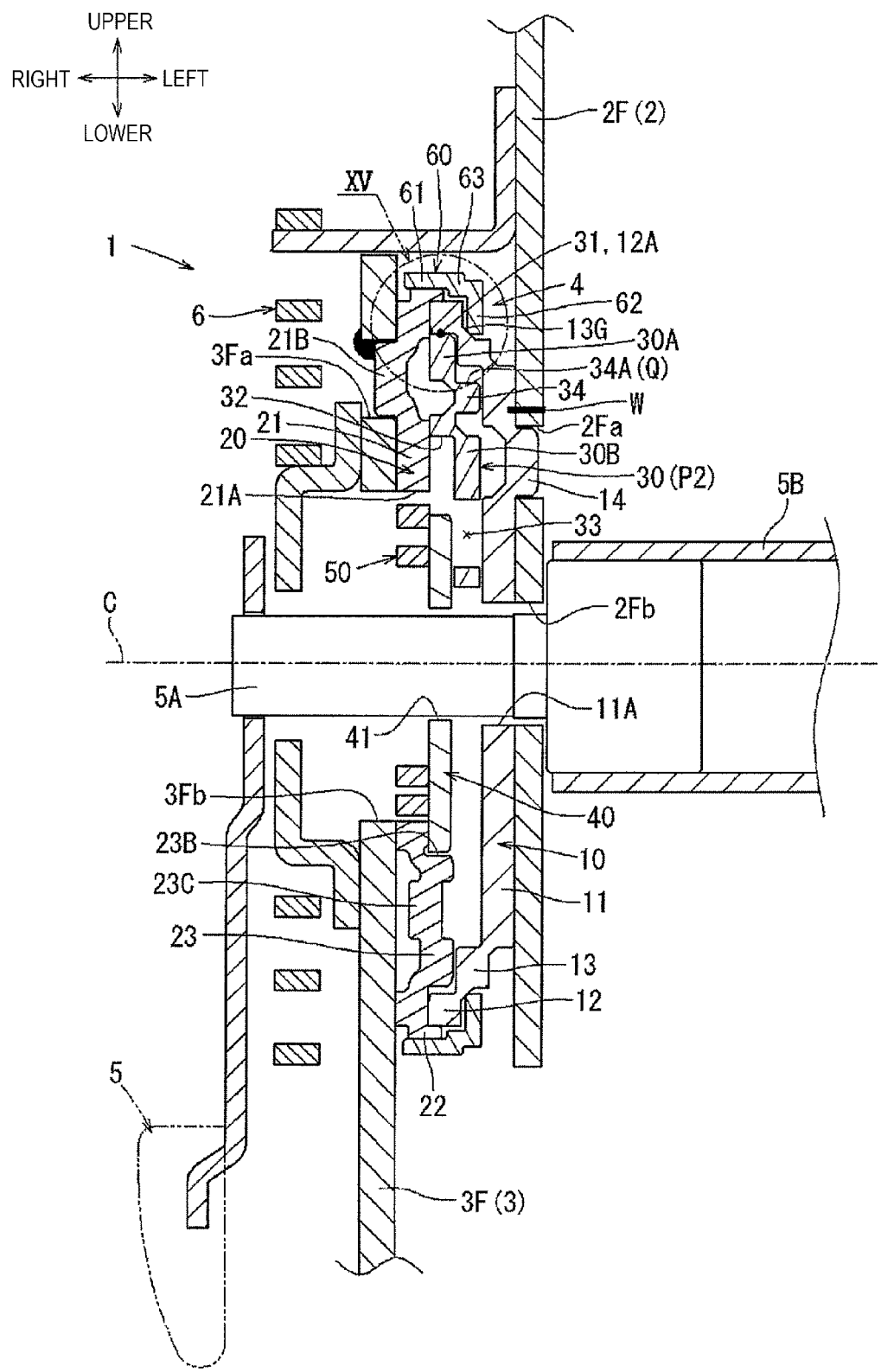
FIG. 9 is a cross-sectional view taken along line IX-IX in FIG. 1.

Specifically, a cylindrical portion 22 protruding in a substantially cylindrical shape in the axial direction as a direction of assembly to the ratchet 10 is formed at an outer peripheral edge portion of a disc body 21 of the guide 20. An inner diameter of the cylindrical portion 22 is slightly larger than an outer diameter of the cylindrical portion 12 of the ratchet 10. As shown in FIG. 9, the guide 20 is set in a state where the cylindrical portion 12 of the ratchet 10 is inserted into the cylindrical portion 22 in the axial direction.

As a result, the guide 20 is assembled to the ratchet 10 in a state of supporting each other from the inner and outer sides so as to be rotatable relative to each other, in a state in which the cylindrical portions 22, 12 thereof are loosely fitted to each other in the radial direction on the inner and outer sides. The outer peripheral ring 60, which will be described later, is mounted in a manner spanning from the outer peripheral side between the cylindrical portion 22 thereof and the cylindrical portion 12 of the ratchet 10, so that the guide 20 is assembled to the ratchet 10 in a manner prevented from detaching in the axial direction via the outer peripheral ring 60 (refer to FIGS. 2 and 3 and FIGS. 6 to 9).

As shown in FIG. 5, on an inner surface of the disc body 21 of the guide 20, guide walls 23 protruding in a substantially fan shape in the axial direction, which is an assembling direction to the ratchet 10, are formed by being extruded in a half-blanking shape at three positions in the circumferential direction. Outer peripheral surfaces of the guide walls 23 in the radial direction are curved so as to draw arcs on concentric circles around the central portion (central axis C). The guide walls 23 are set to be loosely fitted in the cylindrical portion 12 of the ratchet 10 assembled in the cylindrical portion 22 of the guide 20.

Due to formation of the guide walls 23, pawl accommodating grooves 24A that can set the three pawls 30, which will be described later, to be slidable toward the inner side and the outer side in the radial direction, respectively, are formed in regions between the guide walls 23 in the circumferential direction on the inner surface of the disc body 21. In addition, a cam accommodating groove 24B that can set the rotary cam 40 axially rotatable, which will be described later, is formed in a central region on the inner surface of the disc body 21 surrounded by the guide walls 23.

Figure 11:
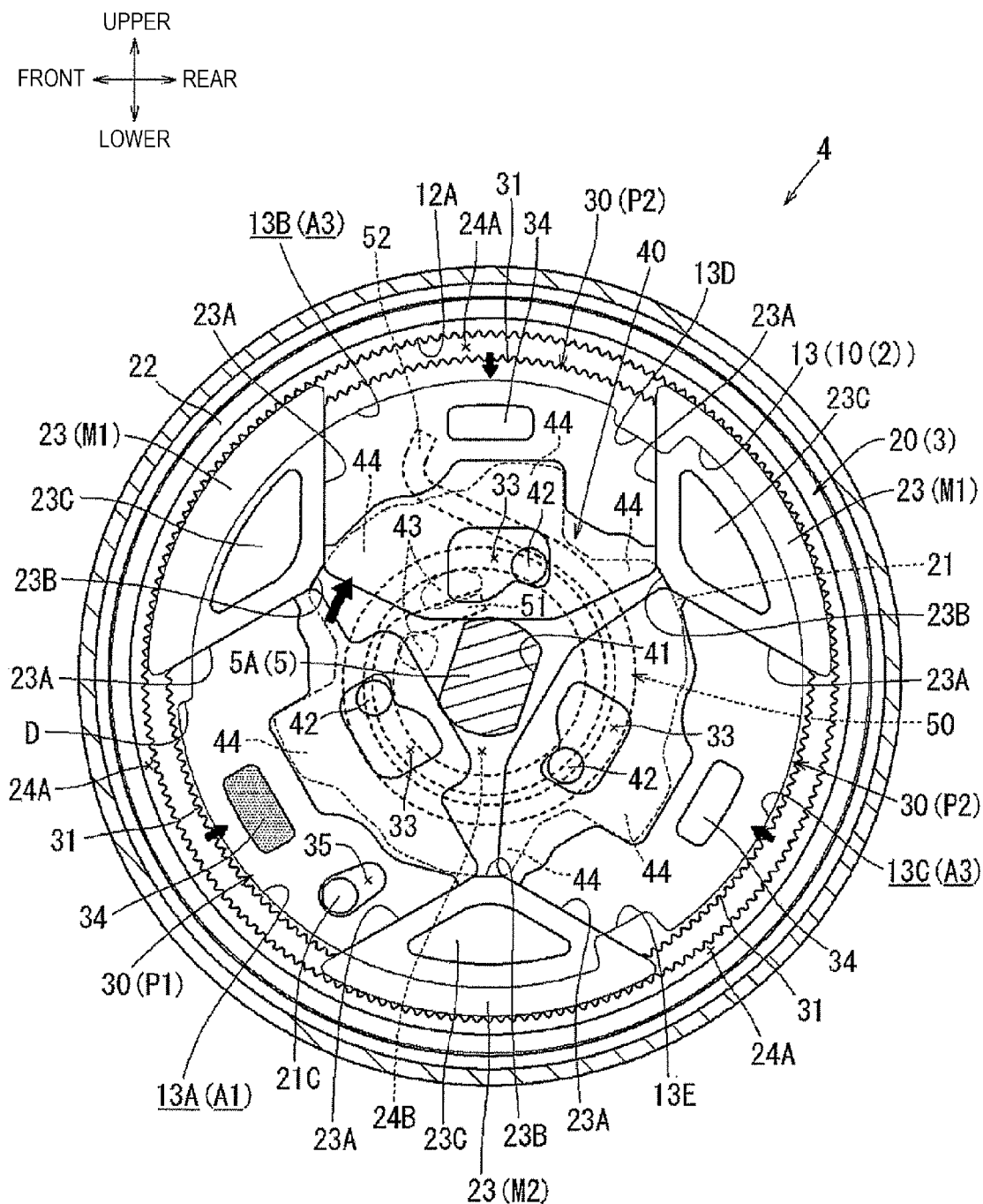
FIG. 11 is a cross-sectional view corresponding to FIG. 10 showing an unlocked state of the vehicle seat reclining apparatus.

As shown in FIGS. 10 and 11, the guide walls 23 are configured to abut the respective corresponding pawls 30 set in the pawl accommodating grooves 24A against regulating surfaces 23A that are both side surfaces in the circumferential direction facing the respective pawl accommodating grooves 24A in a manner facing from both sides in the circumferential direction, thereby supporting the pawls 30 from both sides in the circumferential direction so as to guide the pawls 30 in a manner slidable only toward the inner side and the outer side in the radial direction.

The guide walls 23 are configured to abut the rotary cam 40 set in the cam accommodating groove 24B against support surfaces 23B that are inner peripheral surfaces in the radial direction facing the cam housing groove 24B in a manner facing from the outer side in the radial direction, thereby supporting the rotary cam 40 from the outer side in the radial direction so as to guide the rotary cam 40 in a manner rotatable only in the circumferential direction around the central portion (position on the central axis C) on the disc body 21 of the guide 20.

As shown in FIG. 5, a rattling eliminating pin 21C that protrudes in a columnar shape in the axial direction and that is to be inserted into a wedge-shaped rattling eliminating hole 35 formed in the main pawl P1 is formed on a formation region of the pawl accommodating groove 24A in which the main pawl P1 is set on the inner surface of the disc body 21 of the guide 20. As shown in FIG. 11, when the main pawl P1 is drawn-in toward the inner side in the radial direction and disengaged from the inner peripheral teeth 12A of the ratchet 10, the rattling eliminating pin 21C is located in a region of the wedge-shaped rattling eliminating hole 35 which is on the outer side in the radial direction and have a wide hole width and does not hinder movement of the main pawl P1.

However, as shown in FIG. 10, when the main pawl P1 is pushed toward the outer side in the radial direction and is engaged with the inner peripheral teeth 12A of the ratchet 10, the rattling eliminating pin 21C is pushed into a region on the inner side in the radial direction which have a narrow hole width in the wedge-shaped rattling eliminating hole 35 of the main pawl P1 and is switched to a state in which rattling in the circumferential direction of the main pawl P1 is prevented. According to the above configuration, the main pawl P1 is engaged with the inner peripheral teeth 12A of the ratchet 10 in a state in which rattling is prevented in the circumferential direction, and the ratchet 10 and the guide 20 are locked to each other via the main pawl P1 in a state in which rattling is prevented in the circumferential direction.

As shown in FIGS. 4 and 5, in each of the guide walls 23, a floating island shaped bead portion 23C extruded in a half-blanking shape toward a side opposite to the axial direction that is a direction of assembly to the ratchet 10 is formed in an intermediate portion, which does not include while a peripheral edge, of a protruding region extending in the circumferential direction and the radial direction of the guide wall 23. By forming the bead portions 23C, each of the guide walls 23 has a structure having a high structural strength capable of firmly supporting the pawls 30 from both sides in the circumferential direction without reducing a contact area with each of the pawls 30 for supporting the pawls 30 from both sides in the circumferential direction by the regulating surfaces 23A.

In addition, a through hole 21A set in a state of accommodating a lock spring 50 described later inside is formed in the central portion (position on the central axis C) of the disc body 21 of the guide 20. In the through hole 21A, a hooking hole 21Aa is formed so as to have an elongated hole shape extending toward the outer side in the radial direction from a part of a hole shape of the through hole 21A. An outer end portion 52 of the lock spring 50 that is set in the through hole 21A is set in a state fitted into the hooking hole 21Aa in the axial direction so as to be integrally fixed in the circumferential direction.

As shown in FIG. 4, on the outer surface of the disc body 21 of the guide 20, dowels 21B are formed at three positions in the circumferential direction so as to protrude in a substantially cylindrical shape extruded in the axial direction. The dowels 21B are formed so as to be extruded in the axial direction respectively in regions corresponding to the back sides of the pawl accommodating grooves 24A on the outer surface of the disc body 21.

As shown in FIG. 2, the guide 20 is firmly and integrally coupled to the reclining plate 3F by the dowels 21B protruding from the outer surface of the disc body 21 being fitted into corresponding fitting holes 3Fa formed in the reclining plate 3F and welded. The reclining plate 3F is formed with a penetrating hole 3Fb through which the operation pin 5A passing through the through hole 21A formed in the central portion (position on the central axis C) of the guide 20 can pass to the outside in the axial direction.

<<Pawl 30>>

As shown in FIGS. 4 and 5, the three pawls 30 are each formed by cutting one metal plate member into a substantially rectangular shape and half-blanking in the plate thickness direction (axial direction) in some positions. Specifically, each of the pawls 30 has a shape in which an offset surface portion 30B forming a region on an inner peripheral side in the radial direction thereof is extruded in a half-blanking manner by substantially a plate thickness in the axial direction, which is the direction of assembly to the ratchet 10, with respect to a body surface portion 30A forming a region on an outer peripheral side.

Further, a specific one among the three pawls 30 is configured as the main pawl P1 in a shape partially different from and functionally distinguished from the other two sub pawls P2. The specific difference will be described in detail later.

As shown in FIGS. 10 and 11, the pawls 30 are set so as to be respectively accommodated in the pawl accommodating grooves 24A formed on the inner surface of the disc body 21 of the guide 20. Due to such setting, the pawls 30 are supported from both sides in the circumferential direction in a surface shape by the regulating surfaces 23A of the guide walls 23 respectively facing the pawl accommodating grooves 24A from both sides in the circumferential direction, and are supported so as to be movable only toward the inner side and the outer side in the radial direction along the regulating surfaces 23A.

Specifically, as shown in FIG. 9, in the state where the pawls 30 are respectively set in the pawl accommodating grooves 24A, the body surface portions 30A thereof are set so as to be abutted against the inner surface of the disc body 21 of the guide 20. Thus, each pawl 30 is set to face the inner peripheral teeth 12A of the cylindrical portion 12 of the ratchet 10 assembled in the cylindrical portion 22 of the guide 20 in the radial direction at a position on the outer side in the radial direction than the body surface portion 30A.

The offset surface portion 30B of each pawl 30 is set so as to be spaced apart in the axial direction from the inner surface of the disc body 21 of the guide 20, and is set so as to overlap the intermediate cylindrical portion 13 of the ratchet 10 in the axial direction.

As shown in FIG. 4, on an outer peripheral surface in the radial direction of the body surface portion 30A of each pawl 30, outer peripheral teeth 31 whose tooth surfaces face the outer side in the radial direction are formed continuously over an entire region in the circumferential direction. The outer peripheral surface in the radial direction of each pawl 30 on which the outer peripheral teeth 31 are formed is formed in a curved surface shape along the inner peripheral surface of the cylindrical portion 12 on which the inner peripheral teeth 12A of the ratchet 10 are formed.

According to the above configuration, the outer peripheral teeth 31 of the pawls 30 are pressed against the inner peripheral teeth 12A of the ratchet 10 from the inner side in the radial direction so as to be engaged with the inner peripheral teeth 12A of the ratchet 10 as a whole. Specifically, similarly to the inner peripheral teeth 12A of the ratchet 10 to be engaged, the outer peripheral teeth 31 of the pawls 30 are formed such that the tooth surfaces thereof are arranged at regular intervals in the circumferential direction at a pitch of 2 degrees.

More specifically, however, as shown in FIG. 10, each of the outer peripheral teeth 31 of each pawl 30 are formed in shape such that the tooth surface at the center in the circumferential direction bites deepest into the inner peripheral teeth 12A of the ratchet 10 in an engaged manner, and that has a tooth height gradually reduced so as to bite into the inner peripheral teeth 12A of the ratchet 10 shallower toward both end sides in the circumferential direction.

According to the above configuration, in the pawls 30, not only the tooth surfaces at the central location that are directly oriented to the advancing direction of the pawl 30, but also the other tooth surfaces from the central location toward both end sides in the circumferential direction that are oriented to directions inclined to directions different from the advancing direction, can be appropriately engaged with the corresponding tooth surfaces of the inner peripheral teeth 12A of the ratchet 10 without being caught upon movement of the pawls 30 toward the outer side in the radial direction. Since the specific tooth surface shape of the outer peripheral tooth 31 is the same as that disclosed in JP-A-2015-29635, detailed description thereof will be omitted.

According to the above configuration, each pawl 30 is configured such that when the outer peripheral teeth 31 are engaged with the inner peripheral teeth 12A of the ratchet 10, due to action of a force pressed from the inner side in the radial direction, the entire pawl 30 may be affected by a force biased toward one side in the circumferential direction with the central location in the circumferential direction that is engaged deepest as a fulcrum. However, such action is appropriately prevented by the rattling preventing pin 21C provided on the guide 20 being pushed into the wedge-shaped rattling eliminating hole 35 so as to eliminate rattling in the circumferential direction when the main pawl P1 is engaged with the ratchet 10.

As shown in FIG. 9, the pawls 30 is set such that in a region on the outer side in the radial direction which is surrounded by the body surface portions 30A thereof, the rotary cam 40 set at the central portion (position on the central axis C) of the guide 20, which will be described later, faces the pawls 30 in the radial direction. Due to the above setting, in the pawls 30, the body surface portions 30A are provided at positions on the outer side in the radial direction of the rotary cam 40, and the offset surface portions 30B are provided so as to overlap the rotary cam 40 in the axial direction.

Here, as shown in FIG. 5, an inner peripheral surface portion of the body surface portion 30A of each pawl 30 is formed with a pressed surface portion 32 that faces the rotary cam 40 in the radial direction and receives an action force that is pressed outward from the inner side in the radial direction in accordance with the rotation of the rotary cam 40. Further, an intermediate portion of the offset surface portion 30B of each of the pawls 30 is penetrated in the axial direction by a drawing-in hole 33, which is inserted in the axial direction by each of drawing-in pins 42 formed on the rotary cam 40 and is operated in accordance with the rotation of the rotary cam 40 to be drawn-in toward the inner side in the radial direction. Further, an intermediate portion of the body surface portion 30A of each of the pawls 30 is formed with a riding projection 34 extruded in a half-blanking manner in the axial direction identical to the axial direction of the offset surface portion 30B.

As shown in FIG. 10, when the rotary cam 40 is rotated in an illustrated counterclockwise direction by a spring urging force of the lock spring 50 hooked between the rotary cam 40 and the guide 20, which will be described later, the pressed surface portion 32 of each pawl 30 is pressed outward from the inner side in the radial direction by each corresponding pressing portion 44 formed on an outer peripheral surface portion of the rotary cam 40. Due to the pressing, the outer peripheral teeth 31 of the pawls 30 are pressed against and engaged with the inner peripheral teeth 12A of the ratchet 10, and are held in the engaged state. As a result, the pawls 30 are integrally coupled to the ratchet 10 in the circumferential direction, and relative rotation between the ratchet 10 and the guide 20 is locked via the pawls 30.

Further, as shown in FIG. 11, when the rotary cam 40 is rotated in the illustrated clockwise direction against the spring urging force of the lock spring 50 upon operation on the reclining lever 5, the drawing-in hole 33 of each pawl 30 is drawn-in towards the inner side in the radial direction by the corresponding drawing-in pin 42 of the rotary cam 40 inserted therein. Due to the drawing-in, the outer peripheral teeth 31 of the pawls 30 are disengaged from the inner peripheral teeth 12A of the ratchet 10, and are held in the same disengaged state (unlocked state). As a result, the rotation locked state between the ratchet 10 and the guide 20 is released.

As shown in FIG. 9, the riding projection 34 of each pawl 30 is extruded in a half-blanking manner to the same position in the axial direction identical to the axial direction of the offset surface portion 30B of the pawl 30, and an outer peripheral surface portion 34A thereof is provided so as to face the inner peripheral surface of the intermediate cylindrical portion 13 of the ratchet 10 in the radial direction. As shown in FIG. 10, (a) of FIG. 17 and (a) of FIG. 18, when the rotational position of the ratchet 10 with respect to the guide 20 is in the lock region A1, even if the pawls 30 are pressed toward the outer side in the radial direction by the rotary cam 40, the riding projection 34 of each pawl 30 is not pressed against the inner peripheral surface of the intermediate cylindrical portion 13 of the ratchet 10, and thus does not hinder the engagement between the pawl 30 and the inner peripheral teeth 12A of the ratchet 10.

As shown in FIG. 13, (b) of FIG. 17 and (b) of FIG. 18, when the rotational position of the ratchet 10 with respect to the guide 20 is changed to the free region A2, if the pawls 30 are pressed toward the outer side in the radial direction by the rotary cam 40, the riding projection 34 of each pawl 30 is pressed against the inner peripheral surface of the intermediate cylindrical portion 13 of the ratchet 10 in a riding-on manner, and thus stops the engagement between the pawl 30 and the inner peripheral teeth 12A of the ratchet 10 at an intermediate position.

More specifically, the riding projection 34 of each pawl 30 is configured such that a diameter dimension from a central portion (position on the central axis C) of the guide 20 to the outer peripheral surface portion 34A, that is, a forming position in the radial direction, is different between the main pawl P1 and the other two sub pawls P2. Specifically, the riding projection 34 of the main pawl P1 is formed at a position protruding toward the outer side in the radial direction than the riding projections 34 of the other two sub pawls P2.

As shown in FIG. 10, (a) of FIG. 17, and (a) of FIG. 18, when the riding projection 34 of the main pawl P1 overlaps in the circumferential direction with the region 13A (lock region A1) of the intermediate cylindrical portion 13 of the ratchet 10, even if the riding projection 34 of the main pawl P1 is pushed toward the outer side in the radial direction by the rotary cam 40, the riding projection 34 of the main pawl P1 is not pushed out to a position where it rides on the region 13A, and thus does not hinder the engagement between the main pawl P1 and the inner peripheral teeth 12A of the ratchet 10.

In this case, although the riding projections 34 of the other two sub pawls P2 respectively overlap with the region 13B and the region 13C (other regions A3) which protrude toward the outer side in the radial direction than the region 13A, since the riding projections 34 of the other two sub pawls P2 are formed at positions on the inner side in the radial direction than the riding projection 34 of the main pawl P1, when pushed toward the outer side in the radial direction by the rotary cam 40, the riding projections 34 of the other two sub pawls P2 are not pushed out to positions where they ride on the region 13B and the region 13C, and thus do not hinder the engagement between the sub pawls P2 and the inner peripheral teeth 12A of the ratchet 10.

Further, as shown in FIG. 13, (b) of FIG. 17 and (b) of FIG. 18, when the riding projection 34 of the main pawl P1 overlaps in the circumferential direction with the region 13B (free region A2) of the intermediate cylindrical portion 13 of the ratchet 10, by being pushed toward the outer side in the radial direction by the rotary cam 40, the riding projection 34 of the main pawl P1 rides on the region 13B, and thus stops the engagement between the main pawl P1 and the inner peripheral teeth 12A of the ratchet 10 at an intermediate position.

However, also in this case, although the riding projections 34 of the other two sub pawls P2 respectively overlap with the corresponding region 13C and the region 13A (other region A3), when pushed toward the outer side in the radial direction by the rotary cam 40, the riding projections 34 of the other two sub pawls P2 are not pushed out to positions where they ride on the region 13C and the region 13A, and thus do not stop the movement of the sub pawls P2 toward the outer side in the radial direction at an intermediate position.

Even in such a configuration, since the movement of the main pawl P1 toward the outer side in the radial direction is stopped at the intermediate position, the rotation of the rotary cam 40 is stopped, and thus the sub pawls P2 are not further pushed toward the outer side in the radial direction. Thereby, together with the main pawl P1, the sub pawls P2 are held in the unlocked state prevented from being pressed against the inner peripheral tooth 12A of the ratchet 10.

As shown in FIGS. 4 and 5, on the body surface portion 30A of the main pawl P1, an intermediate portion deviated in the circumferential direction from a formation region of the riding projection 34 is formed with the rattling eliminating hole 35 penetrating in a tapered hole shape from the outer side to the inner side in the radial direction. As shown in FIG. 11, when the main pawl P1 is set on the guide 20, the rattling eliminating hole 35 is set in a state inserted with the rattling filling pin 21C protruding from the inner surface of the disc body 21 of the guide 20. Due to the above setting, when the main pawl P1 is in the unlocked state before being engaged with the inner peripheral teeth 12A of the ratchet 10, the rattling eliminating hole 35 is in a state where the rattling filling pin 21C is positioned in a region on the outer side in the radial direction that has a wide hole width, and thus does not hinder the movement of the main pawl P1.

However, as shown in FIG. 10, when the main pawl P1 is pushed toward the outer side in the radial direction and is engaged with the inner peripheral teeth 12A of the ratchet 10, the rattling eliminating hole 35 pushes the rattling eliminating pin 21C into a region on the inner side in the radial direction that has a narrow hole width, and is switched to a state in which rattling in the circumferential direction of the main pawl P1 is prevented. According to the above configuration, the main pawl P1 is engaged with the inner peripheral teeth 12A of the ratchet 10 in a state in which rattling is prevented in the circumferential direction, and the ratchet 10 and the guide 20 are locked to each other via the main pawl P1 in a state in which rattling is prevented in the circumferential direction.

As shown in FIGS. 4, 5 and FIGS. 19, 20, each of the pawls 30 is formed by individually extruding the offset surface portion 30B and the riding projection 34 with respect to the body surface portion 30A in the same axial direction in a manner spaced apart from each other in the radial direction. At this time, the offset surface portion 30B of each pawl 30 is formed such that accuracy control surfaces Q for enduring an accuracy to a surface shaped via half-blanking are set on the inner peripheral surface portion (pressed surface portion 32) side of the body surface portion 30A that is formed via half-blanking and has a surface facing the inner side in the radial direction, rather than on the outer peripheral surface portion side that is formed via half-blanking and has a surface facing the outer side in the radial direction. According to the above configuration, each of the pawls 30 has a configuration in which the pressed surface portion 32 is formed with high accuracy.

The riding projection 34 of each pawl 30 is formed such that an accuracy control surface Q for enduring an accuracy to a surface shaped via half-blanking is set on the outer peripheral surface portion 34A side that is formed via half-blanking and has a surface facing the outer side in the radial direction. According to the above configuration, each of the pawls 30 has a configuration in which the outer peripheral surface portion 34A is formed with high accuracy. Thereby, each pawl 30 is formed by individually extruding the offset surface portion 30B and the riding projection 34 with respect to the body surface portion 30A in a manner spaced apart from each other in the radial direction, so that the accuracy of the shaping surfaces can be obtained by setting the accuracy control surfaces Q on front and back sides of each other.

The pressed surface portion 32 of each pawl 30, more specifically, regions deviated on both sides in the circumferential direction from the formation location of the riding projection 34 thereof, are pressed from the inner side in the radial direction by the corresponding pressing portion 44 of the rotary cam 40 illustrated in FIG. 4. Therefore, in practice, the pressed surface portion 32 of each pawl 30 has the accuracy control surfaces Q set in regions on both sides that do not overlap with the riding projections 34 thereof in the circumferential direction, but has no accuracy control surfaces Q set in a region that overlaps with the riding projections 34 in the circumferential direction. According to the above configuration, even if the offset surface portion 30B and the riding projection 34 of each pawl 30 overlap with each other in the circumferential direction, it is possible to appropriately set and form the accuracy control surfaces Q.

<<Rotary Cam 40>>

As shown in FIG. 5, the rotary cam 40 is formed by cutting one metal plate member into a substantially disc shape and half-blanking in the plate thickness direction (axial direction) in some positions. The rotary cam 40 is set in a state accommodated in the cam accommodating groove 24B formed on the inner surface of the disc body 21 of the guide 20.

As shown in FIG. 9, the rotary cam 40 has substantially the same plate thickness as each of the pawls 30, and is sandwiched between the inner surface of the disc body 21 of the guide 20 and the offset surface portions 30B of the pawls 30 that are extruded in the axial direction in a half-blanking manner, and surrounded by the body surface portions 30A of the pawls 30 from the outer peripheral side.

As shown in FIG. 5, the central portion (position on the central axis C) of the rotary cam 40 is formed with a through hole 41 through which the operation pin 5A, which is integrally coupled to the reclining lever 5 as illustrated in FIG. 1, is inserted from the inner side in the axial direction and is integrally mounted in the rotation direction. The operation pin 5A is inserted into the through hole 41 of the rotary cam 40 in a manner penetrating from the inner side to the outer side in the axial direction in the axial direction, and is integrally connected with the reclining lever 5 as illustrated in FIG. 1 at a tip end thereof. According to the above configuration, the operation pin 5A can be rotated integrally with the rotary cam 40 in accordance with the pulling operation of the reclining lever 5.

The operation pin 5A is integrally coupled to the operation pin 5A inserted into the apparatus 4 on the other side as illustrated in FIG. 1 via a connecting rod 5B. According to the above configuration, the operation pin 5A on the other side is also integrally rotated by the pulling-up operation of the reclining lever 5, and the rotary cam 40 of the apparatus 4 on the same side is also rotated integrally.

Figure 6:
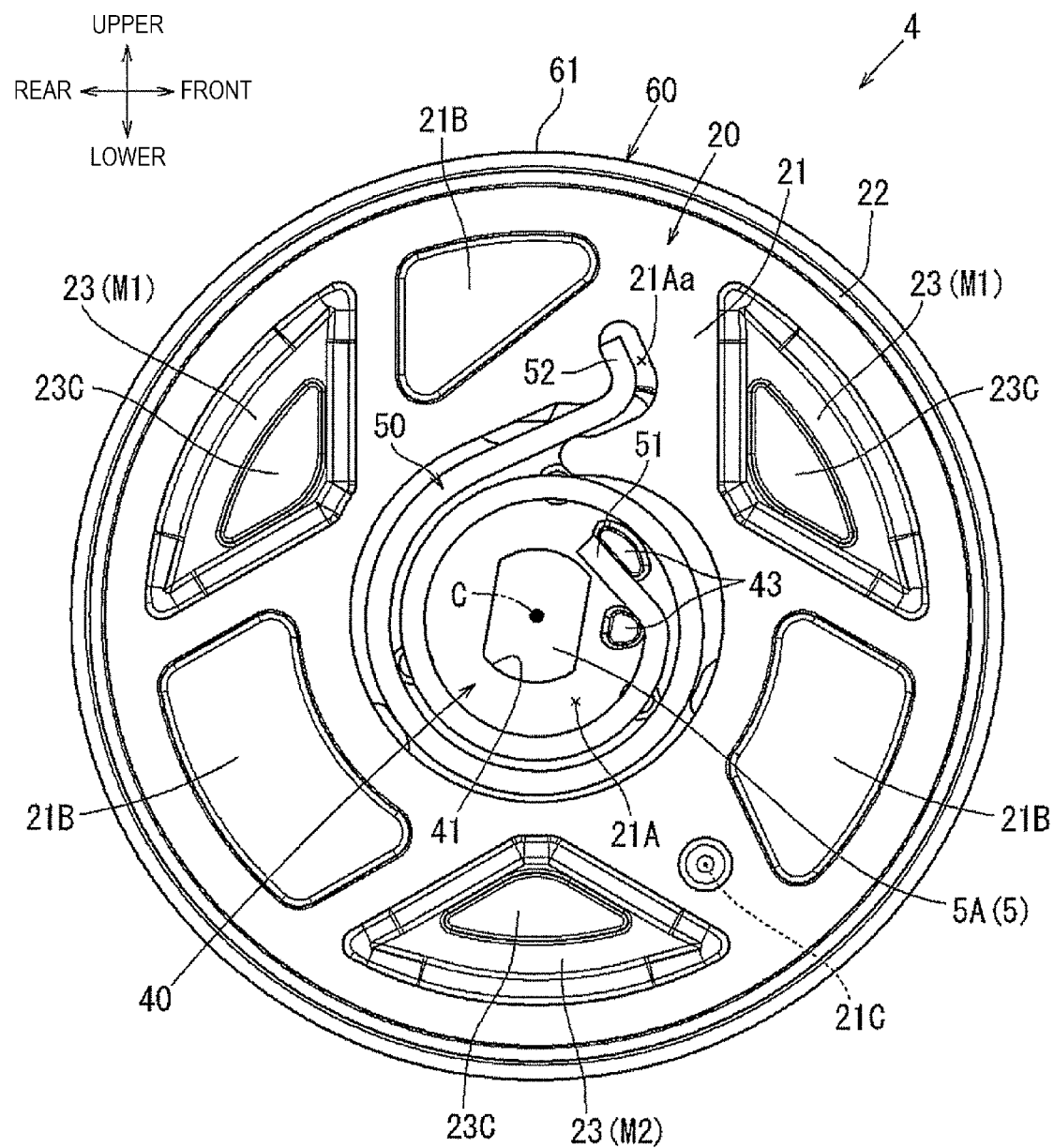
FIG. 6 is an outer side view of the vehicle seat reclining apparatus.

As shown in FIG. 5, the rotary cam 40 is formed in a substantially disc shape larger than the through hole 21A formed in the central portion (position on the central axis C) of the guide 20, and an outer surface thereof that faces an inner side of the through hole 21A of the guide 20 is formed with two hook pins 43 protruding in the axial direction. As shown in FIGS. 2 and 6, an inner end portion 51 of the lock spring 50, which will be described later, is hooked and integrally fixed in a manner sandwiched between the hook pins 43. Further, on an inner surface of the rotary cam 40 that faces the offset surface portions 30B of the pawls 30, the three drawing-in pins 42 set in a state of being respectively inserted into the corresponding drawing-in holes 33 formed in the pawls 30 are formed to protrude in the axial direction.

The rotary cam 40 is assembled to the guide 20 in a state of being elastically supported via the lock spring 50. That is, the rotary cam 40 is elastically supported with respect to the guide 20 via the lock spring 50 from a state set in the cam accommodating groove 24B of the guide 20 by setting the lock spring 50 in the through hole 21A of the guide 20 in a manner such that the inner end portion 51 of the lock spring 50 is hooked between the hook pins 43 protruding from the outer surface thereof that faces the inner side of the through hole 21A of the guide 20 and the outer end portion 52 of the lock spring 50 is further hooked into the hooking hole 21Aa extending from the through hole 21A of the guide 20.

As shown in FIG. 9, due to the assembly described above, the rotary cam 40 is provided in a manner supported in a state of being sandwiched in the axial direction between the disc body 21 of the guide 20 and the offset surface portions 30B extruded of the pawls 30 in a half-blanking manner as in the axial direction, and surrounded from the outer side in the radial direction by the pressed surface portions 32 which are the inner peripheral surface portions of the body surface portions 30A of the pawls 30 as in the radial direction.

The rotary cam 40 is constantly rotationally urged in the counterclockwise direction as shown in FIG. 10 with respect to the guide 20 by the spring urging force of the lock spring 50 hooked between the rotary cam 40 and the guide 20 (see FIGS. 2 and 6). Due to the counterclockwise rotation due to the urging force, the rotary cam 40 is operated to push the pressed surface portions 32 of the pawls 30 outward from the inner side in the radial direction by the respective pressing portions 44 formed so as to protrude at a plurality of positions in the circumferential direction on the outer peripheral surface portion thereof.

Further, when the reclining lever 5 as illustrated in FIG. 1 is pulled up, the rotary cam 40 is rotated in the illustrated clockwise direction, which is opposite to the urging direction, via the operation pin 5A as shown in FIG. 11. As a result, the rotary cam 40 is operated such that each of the drawing-in pins 42 inserted into the drawing-in hole 33 of each pawl 30 moves in the drawing-in hole 33 in the circumferential direction and simultaneously draws in the pawl toward the inner side in the radial direction by the shape of the drawing-in hole 33 that changes toward the outer side in the radial direction.

Specifically, as shown in FIG. 10, in the state in which the pawls 30 are pushed out from the inner side in the radial direction by the rotational force due to the spring urging force of the lock spring 50 and engaged with the inner peripheral teeth 12A of the ratchet 10 (locked state), the rotary cam 40 is in a state where the inner end portion 51 of the lock spring 50 hooked between the hook pins 43 thereof is positioned in a circumferential region between two guide walls M1 respectively on an upper left side and an upper right side in the drawing among the three guide walls 23 formed on the guide 20.

In the above state, due to the spring urging force received from the inner end portion 51 of the lock spring 50, the rotary cam 40 is in a state of being affected by the action of an urging force that is decentered on the outer side in the radial direction in addition to the illustrated rotational urging force in the counterclockwise direction. Nevertheless, when the pawls 30 are engaged with the inner peripheral teeth 12A of the ratchet 10, the rotary cam 40 is supported by the pawls 30 and thereby held in a state centered on the central portion (position on the central axis C) of the guide 20.

Figure 16:
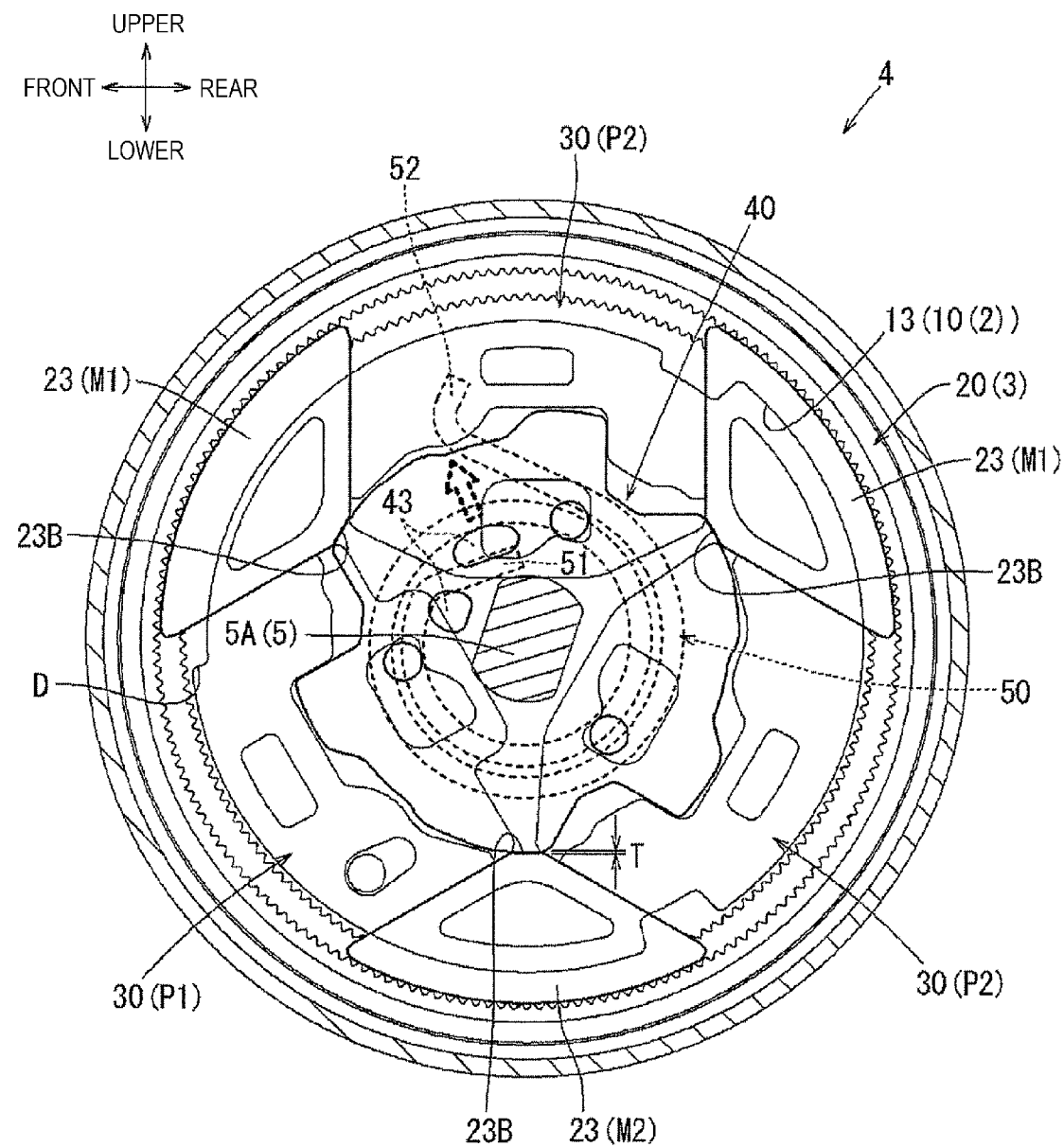
FIG. 16 is a cross-sectional view showing a state in which a rotary cam is urged and thereby pressed against a guide wall.
Figure 17A:
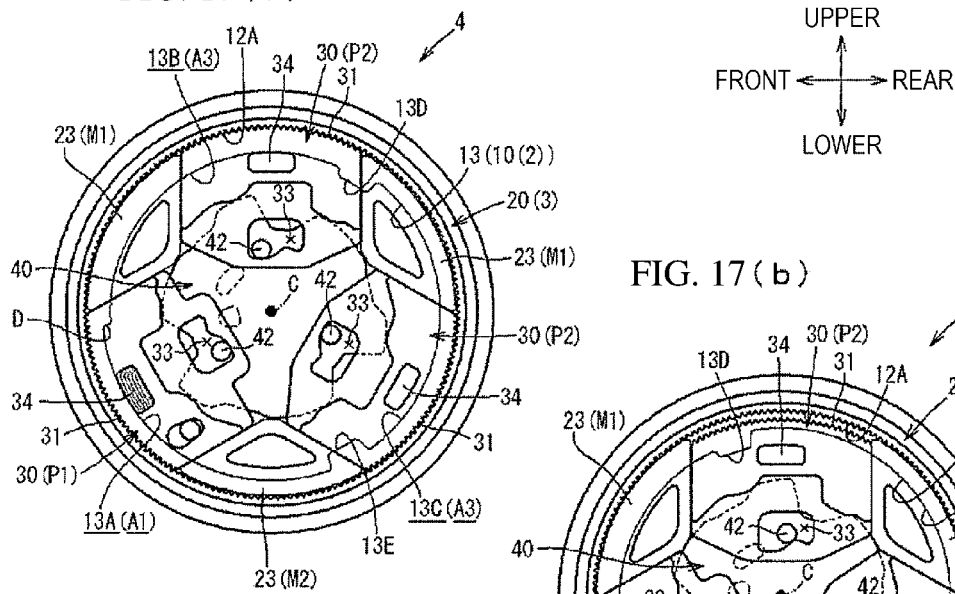
Figure 17B:
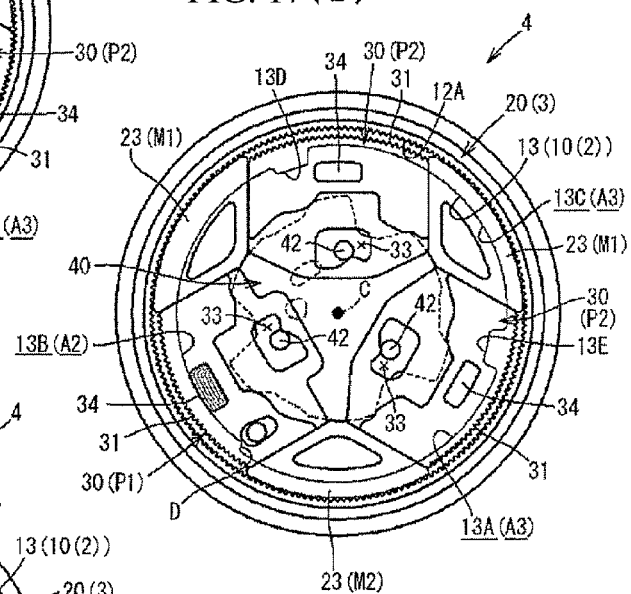
Figure 17C:
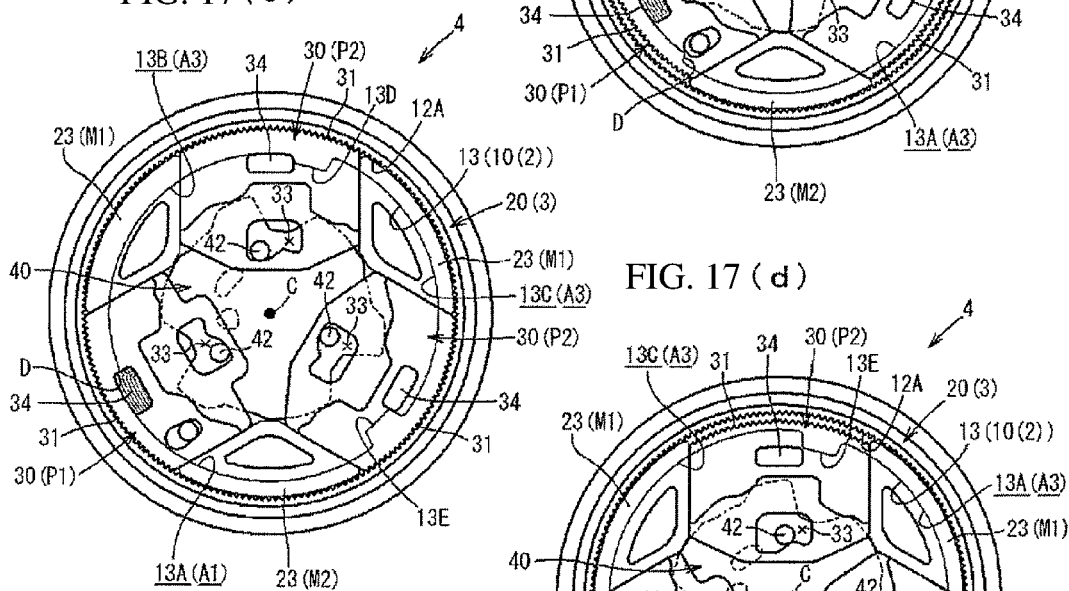
Figure 17D:
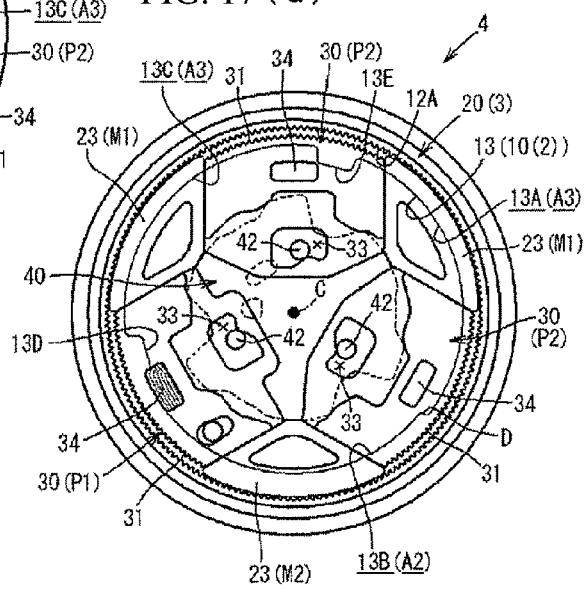

However, when the rotary cam 40 is rotated in the illustrated clockwise direction against the spring urging force of the lock spring 50 and thereby the pawls 30 are disengaged from the inner peripheral teeth 12A of the ratchet 10 as shown in FIG. 11, the rotary cam 40 is urged in a decentering direction by the inner end portion 51 of the lock spring 50, and thus is rotated in the illustrated clockwise direction in a manner sliding on the support surfaces 23B on the inner peripheral side of the above-described two guide walls M1 while being pressed against the support surfaces 23B of the above-described two guide walls M1 as shown in FIG. 16. At this time, different from the other two guide walls M1, the remaining one guide wall M2 has a slight gap T in the radial direction formed between the one guide wall M2 and the outer peripheral surface of the rotary cam 40.

According to such configuration, as shown in FIG. 16, the rotary cam 40 is appropriately supported on the two guide walls M1 on which the rotary cam 40 is pressed against due to the urging force of the lock spring 50 so as not to move in an axial deviation direction (the decentering direction), while appropriately releasing movement of the rotary cam 40 when rattling of the shape occurs in a direction toward the remaining one guide wall M2 with these two guide walls serving fulcrums, so that the rotary cam 40 can be smoothly sliding-rotated in a release direction without decentering.

<<Outer Peripheral Ring 60>>

As shown in FIGS. 4 and 5, the outer peripheral ring 60 is formed in a substantially cylindrical shape having a hollow disc-shaped base by punching one thin plate material into a ring shape and drawing an outer peripheral portion of the punched hollow disc into a shape that protrudes in a cylindrical shape in a thickness direction (axial direction). Thus, the outer peripheral ring 60 includes a flange portion 62 that has a hollow disc shape facing the axial direction, and a coupling portion 61 that protrudes in the axial direction in a substantially cylindrical shape along an outer peripheral edge portion of the flange portion 62.

Specifically, the outer peripheral ring 60 is formed in a stepped cylindrical shape including two stages of inner and outer cylindrical shapes, in which the coupling portion 61 is extruded in a manner protruding in two stages in the axial direction from the outer peripheral portion of the flange portion 62, so as to form a stepped portion 63 that is smaller in the axial direction than the coupling portion 61 and that protrudes in a substantially cylindrical shape on an inner peripheral side of the coupling portion 61. After setting the three pawls 30, the rotary cam 40, and the lock spring 50 to the guide 20 and simultaneously assembling the ratchet 10, these assembled units are set inside the cylinder and the coupling portion 61 is welded to the guide 20, and thereby the outer peripheral ring 60 is mounted spanning the outer peripheral portions of the ratchet 10 and the guide 20.

Figure 15:
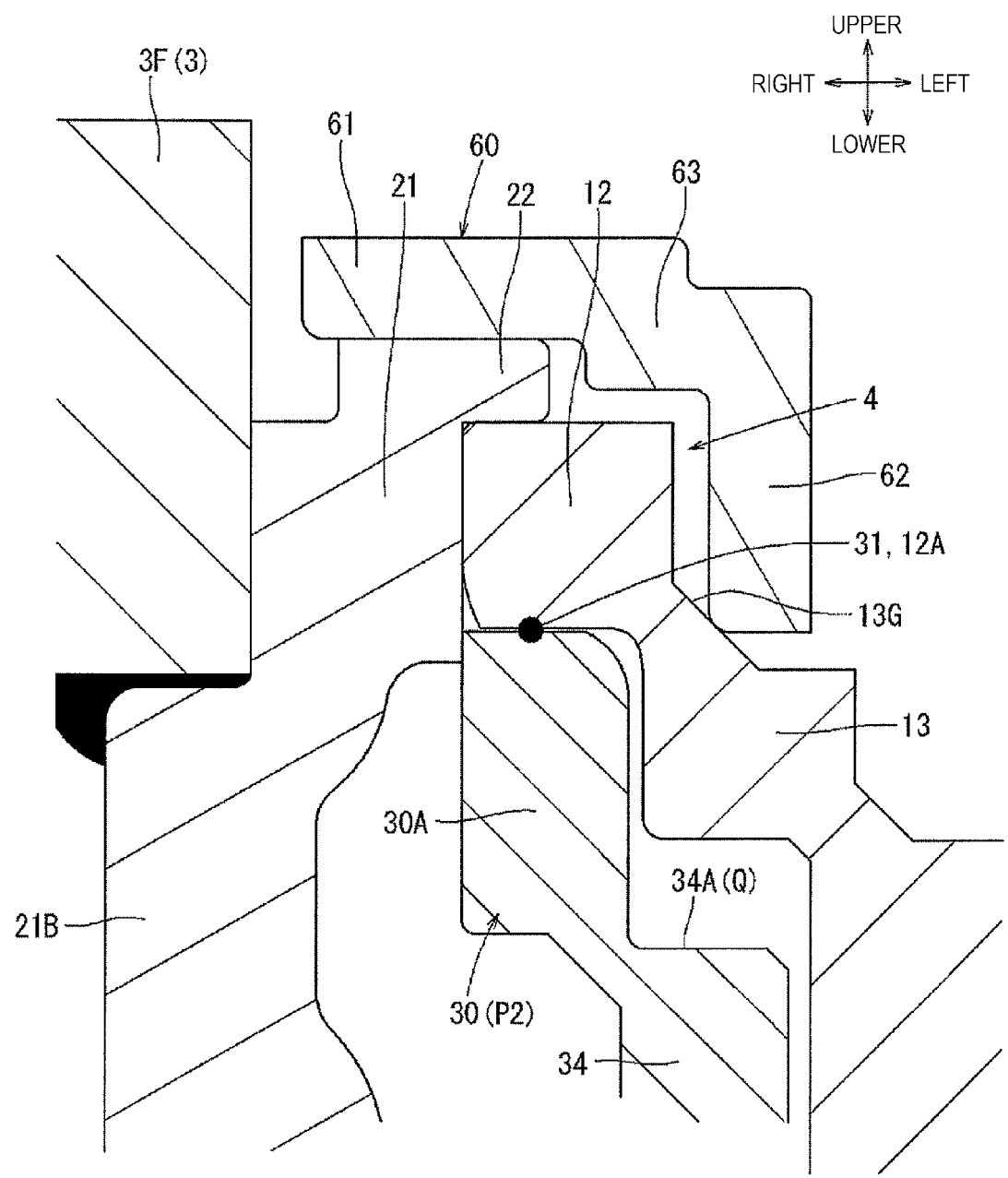
FIG. 15 is an enlarged view of part XV in FIG. 9.

More specifically, by assembling the above-described units in the cylinder starting from the ratchet 10, as shown in FIGS. 9 and 15, the outer peripheral ring 60 is set such that a substantially entire circumferential area of an end portion of the flange portion 62 on the inner side in the radial direction abuts against an inclined surface 13G that is formed on the outer surface side in the axial direction of the intermediate cylindrical portion 13 of the ratchet 10 and that obliquely faces the outer side in the radial direction. Then, due to such setting, the cylindrical portion 22 of the guide 20 is set in a state fitted into the cylindrical coupling portion 61 of the outer peripheral ring 60.

Therefore, after such setting, the coupling portion 61 of the outer peripheral ring 60 is laser-welded from the outer peripheral side and coupled to the cylindrical portion 22 of the guide 20 fitted in the coupling portion 61, whereby the outer peripheral ring 60 is mounted in a manner spanning the outer peripheral portions of the ratchet 10 and the guide 20. The inclined surface 13G formed on the outer surface portion of the intermediate cylindrical portion 13 of the ratchet 10 is formed so as to draw a truncated cone shape around the central portion (central axis C) of the ratchet 10 spanning the entire circumferential direction of the ratchet 10.

Due to such assembly, the outer peripheral ring 60 is integrally coupled to the guide 20, and the ratchet 10 is held by the flange portion 62 thereof without rattling with respect to the guide 20 either in the axial direction or in the radial direction. Specifically, the outer peripheral ring 60 is in a state in which the flange portion 62 thereof is abutted against the inclined surface 13G of the ratchet 10 in the axial direction, and the coupling portion 61 thereof is welded and assembled to the cylindrical portion 22 of the guide 20 which is assembled to the ratchet 10 and positioned in the axial direction. Accordingly, the outer peripheral ring 60 is in a state in which the ratchet 10 is prevented from rattling in the axial direction between the flange portion 62 and the disc body 21 of the guide 20, and the ratchet 10 is supported so as to be smoothly rotated in the unlocked state without rattling either in the axial direction or in the radial direction with respect to the guide 20.

<<Structure for Restricting Movement of Sub Pawls P2>>

As shown in FIG. 21, the drawing-in holes 33 formed in the pawls 30 are formed such that the inner peripheral surfaces thereof, which are drawn-in by the corresponding drawing-in pins 42 of the rotary cam 40, are formed in shapes different between the main pawl P1 and the sub pawls P2 as follows. That is, the surface portion on the inner peripheral side of the drawing-in hole 33 formed in each of the sub pawls P2 is configured such that a projecting portion 33A that protrudes toward the outer side in the radial direction in a thickened manner and is not formed on the surface portion on the inner peripheral side of the drawing-in hole 33 of the main pawl P1 is formed thereon (see FIGS. 19 and 20).

Due to the difference in the shape, as shown in FIG. 21, in a state in which the riding projection 34 of the main pawl P1 rides on the free region A2 of the ratchet 10 and the push movement to the pawls 30 toward the outer side in the radial direction by the rotary cam 40 is regulated, movement of the sub pawls P2 towards the outer side in the radial direction is stopped at an intermediate position at which the riding projections 34 thereof do not reach a position of an inner diameter $\varphi 1$ to which the first protruding portion 13D and the second protruding portion 13E formed on the ratchet 10 project.

Specifically, in a state where the main pawl P1 rides on the free region A2, the projecting portions 33A formed in the drawing-in holes 33 of the sub pawls P2 are abutted against the corresponding drawing-in pins 42 of the rotary cam 40 from the inner side in the radial direction, and thus the movement of the sub pawls P2 toward the outer side in the radial direction is restricted up to the intermediate position. Here, the position of the inner diameter $\varphi 1$ to which the first protruding portion 13D and the second protruding portion 13E project corresponds to the "position where the another pawl and the protruding portion interfere with each other in the radial direction" of the present invention, and the projecting portion 33A corresponds to the "restricting portion" of the present invention.

Therefore, when the ratchet 10 is rotated in the illustrated clockwise direction and thus the main pawl P1 transits from the state of riding on the free region A2 to the lock region A1, the riding projection 34 of the main pawl P1 moves in a manner of going down a step from the free region A2 to the lock region A1 and thus is not caught as a matter of course, and the riding projections 34 of the sub pawls P2 are also not caught by the first protruding portion 13D and the second protruding portion 13E.

SUMMARY

In summary, the apparatus 4 of the present embodiment has the following configuration. That is, the vehicle seat reclining apparatus (4) includes: the disc-shaped ratchet (10) and the disc-shaped guide (20) that are coaxially assembled to each other in a relatively rotatable manner; the lock mechanism (30, 40) provided between the ratchet (10) and the guide (20) and capable of restricting relative rotation between the ratchet and the guide; and the holding ring (60) holding the state in which the ratchet (10) and the guide (20) are assembled. The lock mechanism (30, 40) includes the plurality of pawls (30) supported by the guide (20) in a movable manner in a radial direction, the plurality of pawls configured to engage with the ratchet (10) to restrict relative rotation between the ratchet (10) and the guide (20) when the plurality of pawls (30) move toward the outer side in the radial direction, and the cam (40) configured to move the plurality of pawls (30) towards the inner side in the radial direction or the outer side in the radial direction.

The ratchet (10) has, in the rotation region with respect to the guide (20), the first region (lock region A1) that allows the specific pawl (P1) among the plurality of pawls (30) to move towards the outer side in the radial direction to engage with the ratchet, the second region (free region A2) that prevents the specific pawl (P1) from moving towards the outer side in the radial direction to engage with the ratchet, and the third region (other region A3) in which another pawl (P2) is located when the specific pawl (P1) is in the second region (A2). The first region (A1), the second region (A2), and the third region (A3) are arranged in the circumferential direction.

The third region (other region A3) has the protruding portion (13D, 13E) protruding towards the inner side in the radial direction so as to be abutted by the another pawl (P2) in the circumferential direction when the specific pawl (P1) abuts, in the circumferential direction, against the step (D) formed at the boundary between the first region (lock region A1) and the second region (free region A2). The cam (40) includes the regulating portion (42) configured to regulate the movement range of the another pawl (P2) in the radial direction when the specific pawl (P1) is in the second region (free region A2). The vehicle seat reclining apparatus (4) further includes the restricting portion (33A) configured to restrict the movement range of the another pawl (P2) regulated by the regulating portion (42) to the inner side in the radial direction than the position where the another pawl (P2) and the protruding portion (13D, 13E) interfere with each other in the radial direction (φ1; see FIG. 21).

In this way, when the specific pawl (P1) rides on the second region (free region A2), the restricting portion (33A) restricts the movement range of the another pawl (P2) towards the outer side in the radial direction to the position at which the another pawl (P2) does not interfere with the protruding portion (13D, 13E), and therefore, when the vehicle seat reclining apparatus (4) transits from the second region (free region A2) to the first region (lock region A1), it is possible to prevent the another pawl (P2) from being caught by the protruding portion (13D, 13E).

Embodiment 2

<<Schematic Configuration of Apparatus 4>>

Next, a configuration of a seat reclining apparatus (vehicle seat reclining apparatus) 4 of Embodiment 2 will be described with reference to FIG. 22. In the present embodiment, a restricting portion M3 that restricts the movement of the sub pawls P2 (another pawl) towards the outer side in the radial direction to a position at which the sub pawls P2 do not interfere with the first protruding portion 13D and the second protruding portion 13E (protruding portion) when the riding projection 34 of the main pawl P1 (specific pawl) rides on the free region A2 of the ratchet 10 is configured as follows.

That is, the drawing-in pins 42 (regulating portions) of the rotary cam 40 (cam) that draws-in the pawls 30 towards the inner side in the radial direction are configured such that an inner diameter φ3 from the central axis C of the drawing-in pins 42 that draws-in the sub pawls P2 (round pins) is shorter than an inner diameter φ2 from the central axis C of the drawing-in pin 42 for drawing-in the main pawl P1 (round pin).

According to the above configuration, in a state in which the riding projection 34 of the main pawl P1 rides on the free region A2 of the ratchet 10 and the push movement to the pawls 30 towards the outer side in the radial direction by the rotary cam 40 is regulated, movement of the sub pawls P2 towards the outer side in the radial direction is stopped at an intermediate position at which the riding projections 34 thereof do not reach a position of an inner diameter φ1 to which the first protruding portion 13D (protruding portion) and the second protruding portion 13E (protruding portion) formed on the ratchet 10 project.

That is, in the present embodiment, the restriction portion M3 is configured to restrict the movement range of the sub pawls P2 (another pawl) regulated by the drawing-in pins 42 (regulating portion) to the inner side than the position of the main pawl P1 (specific pawl) when the main pawl P1 (specific pawl) moves to the outermost side in the radial direction in the second region (free region A2). Specifically, the plurality of drawing-in pins 42 protruding in the axial direction from the rotary cam 40 are provided as the regulating portion, and the restricting portion M3 protrudes such that the surface of the drawing-in hole 33 of the sub pawl P2 (another pawl) in contact with one of the drawing-in pins 42 in the radial direction is positioned on the outer side in the radial direction than the surface of the drawing-in hole 33 of the main pawl P1 (specific pawl) in contact with another one of drawing-in pins 42 in the radial direction.

In this way, even if the control structure for drawing-in the pawls 30 by the rotary cam 40 is changed between one for the main pawl P1 and one for the sub pawls P2, it is possible to prevent the sub pawls P2 from being caught by the first protruding portion 13D and the second protruding portion 13E when the apparatus 4 transits from the free region A2 to the lock region A1. Configurations other than the above are the same as those in Embodiment 1 and are accordingly denoted by the same reference numerals and detailed descriptions thereof are omitted.

Embodiment 3

<<Schematic Configuration of Apparatus 4>>

Next, a configuration of a seat reclining apparatus (vehicle seat reclining apparatus) 4 of Embodiment 3 will be described with reference to FIG. 23. In the present embodiment, a restricting portion M4 that restricts the outward movement of the sub pawls P2 (another pawl) in the radial direction to a position at which the sub pawls do not interfere with the first protruding portion 13D and the second protruding portion 13E (protruding portion) when the riding projection 34 of the main pawl P1 (specific pawl) rides on the free region A2 of the ratchet 10 is configured as follows.

That is, the structures for pushing the pawls 30 towards the outer side in the radial direction by the rotary cam 40 (cam) are substantially the same between one for the main pawl P1 and one for the sub pawls P2. The position at which the main pawl P1 rides on the free region A2 and thus is regulated from moving towards the outer side in the radial direction and position at which the sub pawls P2 are regulated from moving towards the outer side in the radial direction by the corresponding drawing-in pins 42 (regulating portions) are substantially the same. Further, the riding projection 34 formed on the main pawl P1 and the riding projections 34 formed on the sub pawls P2 are formed at substantially the same position in the radial direction.

However, the first protruding portion 13D and the second protruding portion 13E are formed to have a protruding height such that a gap S between the protruding portion and the riding projection 34 of each sub pawl P2 in the radial direction is present in a state where the riding projection 34 of the main pawl P1 rides on the free region A2.

That is, in the present embodiment, the restricting portion M4 is configured such that when the main pawl P1 (specific pawl) is in the free region A2 (second region), the projections 34, which protrude in the axial direction from the sub pawls P2 (another pawl) so as to abut against the protruding portion in the circumferential direction, and the protruding portion have the gap S therebetween in the radial direction.

According to such configuration as well, it is possible to prevent the sub pawls P2 from being caught by the first protruding portion 13D and the second protruding portion 13E when the apparatus 4 transits from the free region A2 to the lock region A1. Configurations other than the above are the same as those in Embodiment 1 and are accordingly denoted by the same reference numerals and detailed descriptions thereof are omitted.

Embodiment 4

<<Schematic Configuration of Apparatus 4>>

Next, a configuration of a seat reclining apparatus (vehicle seat reclining apparatus) 4 of Embodiment 4 will be described with reference to FIG. 24. In the present embodiment, a restricting portion M5 that restricts the movement of the sub pawls P2 (another pawl) towards the outer side in the radial direction to a position at which the sub pawls do not interfere with the first protruding portion 13D and the second protruding portion 13E (protruding portion) when the riding projection 34 of the main pawl P1 (specific pawl) rides on the free region A2 of the ratchet 10 is configured as follows.

That is, the structures for pushing the pawls 30 towards the outer side in the radial direction by the rotary cam 40 (cam) are substantially the same between one for the main pawl P1 and one for the sub pawls P2. The position at which the main pawl P1 rides on the free region A2 and thus is regulated from moving towards the outer side in the radial direction and the position at which the sub pawls P2 are regulated from moving towards the outer side in the radial direction by the corresponding drawing-in pins 42 (regulating portions) are substantially the same.

However, the riding projection 34 formed on each sub pawl P2 is formed at a position retracted towards the inner side in the radial direction than the riding projection 34 formed on the main pawl P1, and the riding projection 34 of each sub pawl P2 is formed to have a protruding height such that a gap S in the radial direction between the riding projection and the first protruding portion 13D and the second protruding portion 13E in a state where the riding projection 34 of the main pawl P1 rides on the free region A2.

That is, in the present embodiment, the restricting portion M5 is configured such that when the main pawl P1 (specific pawl) is in the free region A2 (second region), the protruding portion has the protruding height that has the gap S between the protruding portion and the riding projection 34 of each sub pawl P2 (another pawl) is present in the radial direction.

According to such configuration as well, it is possible to prevent the sub pawls P2 from being caught by the first protruding portion 13D and the second protruding portion 13E when the apparatus 4 transits from the free region A2 to the lock region A1. Configurations other than the above are the same as those in Embodiment 1 and are accordingly denoted by the same reference numerals and detailed descriptions thereof are omitted.

OTHER EMBODIMENTS

Although the embodiment of the present invention has been using the four embodiments, the present invention can be implemented in various forms in addition to the above embodiments. For example, the vehicle seat reclining apparatus of the present invention can be applied to a seat other than a right seat of an automobile, and can also be widely applied to a seat provided for a vehicle other than an automobile for railway or the like, or various vehicles such as an aircraft and a ship. In addition to one that connect the seat back to the seat cushion in a state in which the backrest angle can be adjusted, the vehicle seat reclining apparatus may connect the seat back to a base fixed to the vehicle body side such as a bracket in a state in which the backrest angle can be adjusted.

Further, the vehicle seat reclining apparatus may be configured such that the ratchet is coupled to a member on a side fixed to a vehicle body such as a seat cushion, and the guide may be coupled to the seat back. Further, the plurality of pawls constituting the lock mechanism of the vehicle seat reclining apparatus may be arranged in two or four or more in the circumferential direction. The arrangement of the pawls in the circumferential direction is not limited to equal arrangement, and may be arrangement in a biased manner.

Further, in addition to the type that pushes the pawls towards the outer side in the radial direction via rotation, the cam operated to push the pawls towards the outer side in the radial direction may be of a type that slides to push the pawls towards the outer side in the radial direction via slide in the radial direction intersecting the sliding direction (see JP-A-2015-227071). The operation of drawing-in the pawls towards the inner side in the radial direction may be performed by a member other than the cam such as a release plate (see the same reference).

This application is based on a Japanese patent application filed on May 9, 2018 (Japanese Patent Application No. 2018-090765), the contents of which are incorporated herein by reference.

INDUSTRIAL APPLICABILITY

According to the vehicle seat reclining apparatus of the present invention, it is possible to prevent a pawl from being caught when the apparatus transits from a free region to a lock region. The present invention having this effect is useful, for example, for a seat of an automobile or the like.

REFERENCE SIGNS LIST 1 seat
2 seat back
2F side frame (seat frame)
2Fa fitting hole
2Fb penetrating hole
3 seat cushion
3F reclining plate
3Fa fitting hole
3Fb penetrating hole
4 seat reclining apparatus (vehicle seat reclining apparatus)
5 reclining lever
5A operation pin
5B connecting rod
6 return spring
10 ratchet
11 disc body
11A through hole
11B expanded surface portion
12 cylindrical portion
12A inner peripheral teeth
13 intermediate cylindrical portion
13A first region
13B second region
13C third region
13D first protruding portion (protruding portion)

13E second protruding portion (protruding portion)
13G inclined surface
A1 lock region (first region)
A2 free region (second region)
A3 other region (third region)
A4 coupling region
D step
14 dowel
W welding location
20 guide
21 disc body
21A through hole
21Aa hooking hole
21B dowel
21C rattling eliminating pin
22 cylindrical portion
23 guide wall
23A regulating surface
23B support surface
23C bead portion
M1 guide wall
M2 guide wall
T gap
24A pawl accommodating groove
24B cam accommodating groove
30 pawl (lock mechanism)
30A body surface portion
30B offset surface portion
31 outer peripheral teeth
32 pressed surface portion
33 drawing-in hole
33A projecting portion (restricting portion)
34 riding projection (projection)
34A outer peripheral surface portion
35 rattling eliminating hole
P1 main pawl (specific pawl)
P2 sub pawl (anther pawl)
Q accuracy control surface
40 rotary cam (cam, lock mechanism)
41 through hole
42 drawing-in pin (regulating portion)
43 hook pin
44 pressing portion
50 lock spring
51 inner end portion
52 outer end portion
60 outer peripheral ring (holding ring)
61 coupling portion
62 flange portion
63 step portion
C central axis
M3 to M5 restricting portion
φ1 inner diameter (position where another pawl and protruding portion interfere with each other)
φ2 inner diameter
φ3 inner diameter
S gap

The invention claimed is:

1. A vehicle seat reclining apparatus comprising:
a disc-shaped ratchet and a disc-shaped guide that are coaxially assembled to each other in a relatively rotatable manner;
a lock mechanism provided between the ratchet and the guide and capable of restricting relative rotation between the ratchet and the guide; and
a holding ring holding a state in which the ratchet and the guide are assembled,
wherein the lock mechanism includes:
a plurality of pawls supported by the guide in a movable manner in a radial direction, the plurality of pawls being configured to engage with the ratchet to restrict relative rotation between the ratchet and the guide when the plurality of pawls move towards an outer side in the radial direction; and
a cam configured to move the plurality of pawls towards an inner side in the radial direction or the outer side in the radial direction,
wherein the ratchet has:
a first region that allows a specific pawl among the plurality of pawls to move towards the outer side in the radial direction to engage with the ratchet;
a second region that prevents the specific pawl from moving towards the outer side in the radial direction to engage with the ratchet; and
a third region in which another pawl is located when the specific pawl is in the second region, the first region, the second region, and the third region being arranged in a circumferential direction,
wherein the third region has a protruding portion protruding towards the inner side in the radial direction so as to be abutted by the another pawl in the circumferential direction when the specific pawl abuts, in the circumferential direction, against a step formed at a boundary between the first region and the second region,
wherein the cam includes a regulating portion configured to regulate a movement range of the another pawl in the radial direction when the specific pawl is in the second region, and
wherein the vehicle seat reclining apparatus further includes a restricting portion configured to restrict the movement range of the another pawl regulated by the regulating portion to an inner side in the radial direction than a position where the another pawl and the protruding portion interfere with each other in the radial direction.

2. The vehicle seat reclining apparatus according to claim 1,
wherein the restricting portion is configured to restrict the movement range of the another pawl regulated by the regulating portion to the inner side than a position of the specific pawl when the specific pawl moves to an outermost side in the radial direction in the second region.

3. The vehicle seat reclining apparatus according to claim 2,
wherein the regulating portion includes a plurality of drawing-in pins protruding in an axial direction from the cam, and
wherein the restricting portion protrudes such that a surface of a drawing-in hole of the another pawl in contact with one of the plurality of drawing-in pins in the radial direction is positioned on the outer side in the radial direction than a surface of a drawing-in hole of the specific pawl in contact with another one of the plurality of drawing-in pins in the radial direction.

4. The vehicle seat reclining apparatus according to claim 1,
wherein the restricting portion is configured such that, when the specific pawl is in the second region, a projection, which protrudes in the axial direction from the another pawl so as to abut against the protruding portion in the circumferential direction, and the protruding portion have a gap therebetween in the radial direction.

5. The vehicle seat reclining apparatus according to claim 4, wherein the protruding portion has a protruding height such that, when the specific pawl is in the second region, a gap between the protruding portion and the projection of the another pawl in the radial direction is present.

6. The vehicle seat reclining apparatus according to claim 1, wherein the plurality of pawls include a main pawl as the specific pawl, and two sub pawls including the another pawl, and
wherein the sub pawls include the restricting portion.

7. The vehicle seat reclining apparatus according to claim 1, wherein the restricting portion is arranged on a wall defining a pawl drawing-in hole.

* * * * *